(12) United States Patent
Hayes

(10) Patent No.: US 11,655,715 B2
(45) Date of Patent: May 23, 2023

(54) SURFACE TOPOLOGY MANIPULATION FOR PERFORMANCE ENHANCEMENT OF ADDITIVELY MANUFACTURED FLUID-INTERACTING COMPONENTS

(71) Applicant: Special Aerospace Services, LLC, Boulder, CO (US)

(72) Inventor: Christopher Hayes, Denver, CO (US)

(73) Assignee: Special Aerospace Services, LLC, Boulder, CO (US)

( * ) Notice: Subject to any disclaimer, the term of this patent is extended or adjusted under 35 U.S.C. 154(b) by 412 days.

(21) Appl. No.: 17/130,916

(22) Filed: Dec. 22, 2020

(65) Prior Publication Data

US 2021/0189882 A1 Jun. 24, 2021

Related U.S. Application Data

(60) Provisional application No. 62/953,051, filed on Dec. 23, 2019.

(51) Int. Cl.

| *F01D 5/14* | (2006.01) |
| *F02K 9/60* | (2006.01) |
| *G06F 30/28* | (2020.01) |
| *G06F 30/15* | (2020.01) |
| *B29C 33/38* | (2006.01) |

(Continued)

(52) U.S. Cl.
CPC ............... *F01D 5/14* (2013.01); *B29C 33/38* (2013.01); *B29C 45/2612* (2013.01); *F02K 9/60* (2013.01); *G06F 30/15* (2020.01); *G06F 30/28* (2020.01); *B33Y 80/00* (2014.12); *F05D 2230/31* (2013.01); *F05D 2300/514* (2013.01); *F05D 2300/516* (2013.01); *G06F 2113/10* (2020.01)

(58) Field of Classification Search
CPC . F01D 5/14; G06F 30/15; G06F 30/28; G06F 2113/10; B29C 33/38; B29C 45/2612; B33Y 80/00; F05D 2230/31; F05D 2300/514; F05D 2300/516
See application file for complete search history.

(56) References Cited

U.S. PATENT DOCUMENTS 10,507,638 B2    12/2019   Nuechterlein
11,045,875 B2 *   6/2021   Nuechterlein ............ C22C 1/10
(Continued)

*Primary Examiner* — Igor Kershteyn
(74) *Attorney, Agent, or Firm* — Critical Path IP Law, LLC

(57) ABSTRACT

Methods and systems for manipulating surface topology of additively manufactured fluid interacting structures, such as additively manufactured heat exchangers or airfoils, and associated additively manufactured articles, are disclosed. In one aspect, an article which interacts with a fluid is imparted with surface topology features which affect performance parameters related to the fluid flow. The topological features may be sequenced, combined, intermixed, and functionally varied in size and form to locally manipulate and co-optimize multiple performance parameters at each or selectable differential lengths along a flow path. The co-optimization method may uniquely prioritize selectable performance parameters at different points along the flow path to improve or enhance overall system performance. Topological features may include design features such as dimples, fins, boundary layer disruptors, and biomimicry surface textures, and manufacturing artefacts such as surface roughness and subsurface porosity distribution and morphology.

20 Claims, 20 Drawing Sheets

(51) Int. Cl.
*B29C 45/26* (2006.01)
*B33Y 80/00* (2015.01)
*G06F 113/10* (2020.01)

(56) References Cited

U.S. PATENT DOCUMENTS

| | | |
|---|---|---|
| 11,203,067 B2 * | 12/2021 | Nuechterlein .......... B22F 10/32 |
| 2016/0271878 A1 | 9/2016 | Nuechterlein |
| 2018/0161874 A1 | 6/2018 | Nuechterlein |
| 2019/0299290 A1 | 10/2019 | Kuhns |
| 2020/0023584 A1 * | 1/2020 | Portela .................... B29C 64/30 |
| 2020/0047288 A1 * | 2/2020 | Schiffres ................. B22F 10/28 |
| 2020/0049415 A1 * | 2/2020 | Schiffres ............... F28D 15/046 |
| 2022/0055153 A1 * | 2/2022 | Schiffres ............... F28F 21/081 |

* cited by examiner

410

410

420

420

|          | Decrease dP | Increase Nu | Decrease C | Score |
|----------|-------------|-------------|------------|-------|
| Design A | 3.28        | 3.11        | 0.26       | 1     |
| Design B | 0.60        | 1.81        | 0.44       | 3     |
| Design C | 0.73        | 1.41        | 0.37       | 3     |
| Design D | 0.60        | 1.84        | 0.24       | 3     |

Figure 5

SURFACE TOPOLOGY MANIPULATION FOR PERFORMANCE ENHANCEMENT OF ADDITIVELY MANUFACTURED FLUID-INTERACTING COMPONENTS

CROSS-REFERENCE TO RELATED APPLICATION

This application is a nonprovisional patent application of and claims the benefit of U.S. Provisional Patent Application No. 62/953,051, filed Dec. 23, 2019 and titled "Additive Manufacturing for Aerospace Applications," the disclosure of which is hereby incorporated herein by reference in entirety.

STATEMENT

This invention was made with government support under Contract No. FA9300-18-P-1502 awarded by the United States Air Force AFTC/PZRB. The government has certain rights in the invention.

FIELD

The disclosure relates generally to methods and systems for manipulating surface topology of fluid interacting structures and the resulting structural articles, and more specifically to methods of designing surface topology for performance enhancement of additively manufactured fluid interacting structures and associated additively manufactured articles.

BACKGROUND

Fluid interacting structures, including manifold structures which contain and transport fluid, and non-manifold structures which experience flow over a surface, are ubiquitous to fluid systems. These structures can serve purposes in addition to simple fluid transfer or guidance, including flow conditioning, heat transfer, heat transportation, and heat rejection, encouraging or discouraging mixing within the flow, maintaining chemical stability, and many other purposes. Especially for heat exchangers, traditional approaches to production attempt to increase fluid flow performance while also increasing heat transfer, or instead to optimize performance over the length of the heat exchanger flow path. Though many historical examples exist of methods to improve desired performance variables via surface features, such as the application of dimples to decrease drag and increase heat transfer, the traditional approaches are limited if not unable to optimize a fluid manifold over the length of a fluid manifold to meet design objectives for multiple variables, such as increases fluid flow performance with increased heat transfer.

The disclosure solves these needs by improving performance over the length of a fluid interacting surface, (such as the walls of a heat exchanger or other flow device) to meet design objectives for multiple variables, using flow conditioning features which may manipulate or optimize heat transfer, flow friction, turbulence, fluid temperature, fluid degradation, and/or other performance relevant parameters using surface topology features and manipulations of the surface topology features. Surface features may include but are not limited to: 1) features inherent to the manufacturing process and manipulable with manufacturing parameters, such as surface roughness and subsurface porosity, and 2) features directly-designed into the manufactured geometry, such as dimples, fins, airfoil-like features, boundary layer disruptors, any number of biomimicry designs including bird feathers, shark denticles, and fish scales. These features may be varied in size, shape, and number, and intermixed with other features for desired performance results.

The methods of manipulating surface topology of a fluid interacting structure and the resulting articles are achieved by additive manufacturing.

The phrases "additive manufacturing" and "3D printing" mean the process manufacturing objects from 3D model data through the repeated addition of small amounts of material, usually layer upon layer.

Additive manufacturing technologies enable a large degree of design freedom due to the method of repeatedly adding a small amount of material to build a part. Ideally, material may be added anywhere and in any amounts, meaning almost any form may be built at any size. Compared to many other manufacturing methods, freeform surfaces, complex features, and otherwise impossible features, like complex sealed internal cavities, may be readily manufactured. This freedom allows for a designer to locally vary geometries with little restriction. With the freedom to locally manipulate surface topology on a small scale, a designer may then use modern engineering design tools, analysis tools, and computational methods such as generative design or topology optimization algorithms, like optimality criteria algorithms or genetic algorithms, to perform analysis and design of surface features to locally improve flow-related performance. These surface features may be locally varied across a large additive manufacturable part to optimize performance at every location.

Methods of designing surface topology for fluid interacting structures, such as additively manufactured heat exchangers or airfoils, are disclosed. In one aspect, a structure which interacts with a fluid is imparted with surface topology features which affect performance parameters related to the fluid flow. The topological features may be sequenced, combined, intermixed, and functionally varied in size and form to locally manipulate and co-optimize multiple performance parameters at each or selectable differential lengths along a flow path. The co-optimization method may uniquely prioritize selectable performance parameters at different points along the flow path to improve or enhance overall system performance. Topological features may include design features such as dimples, fins, boundary layer disruptors, and biomimicry surface textures, and manufacturing artefacts such as surface roughness and subsurface porosity distribution and morphology.

In one embodiment, a method of design for localized performance co-optimization for every point (differential length) along a flow path and overall performance improvement is disclosed. Generally, the disclosure addresses, among other things, the task of imparting features into a fluid interacting surface and the task of locally varying the form of the features to manipulate performance related parameters

SUMMARY

The present disclosure can provide several advantages depending on the particular aspect, embodiment, and/or configuration.

Methods and systems for manipulating surface topology of fluid interacting structures, such as additively manufactured heat exchangers or airfoils, and associated additively manufactured articles, are disclosed. In one aspect, an article which interacts with a fluid is imparted with surface topology features which affect performance parameters related to the fluid flow. The topological features may be sequenced, combined, intermixed, and functionally varied in size and form to locally manipulate and co-optimize multiple performance parameters at each or selectable differential lengths along a flow path. The co-optimization method may uniquely prioritize selectable performance parameters at different points along the flow path to improve or enhance overall system performance. Topological features may include design features such as dimples, fins, boundary layer disruptors, and biomimicry surface textures, and manufacturing artefacts such as surface roughness and subsurface porosity distribution and morphology.

In one embodiment, a method of manipulating a surface topology of an additively manufactured article is disclosed, the method comprising: determining a set of design objectives for an article; assembling a set of candidate surface topology designs, each of the candidate surface topology designs comprising a candidate surface design to form a set of candidate surface designs; quantifying a set of performance measurements of each of the set of candidate surface designs; categorizing the set of candidate surface designs with respect to the set of design objectives; selecting a first particular candidate surface design from the set of candidate surface designs, the first particular candidate surface design associated with a first particular article location of the article; generating a first set of additive manufacturing specifications associated with the first particular article location; and additively manufacturing the article to satisfy the first set of additive manufacturing specifications; wherein: an additively manufactured article is produced.

In one aspect, the article is a fluid manifold. In another aspect, the fluid manifold is a Liquid Rocket Engine fluid manifold. In another aspect, the article is an airfoil. In another aspect, the set of performance measurements comprise experimentally-generated performance measurements. In another aspect, each of the set of candidate surface topology designs further comprises a candidate surface manufacturing design to form a set of candidate surface manufacturing designs. In another aspect, the method further comprises the step of selecting a first particular candidate surface manufacturing design from the set of candidate surface manufacturing designs, the first particular candidate manufacturing surface design associated with the first particular article location of the article. In another aspect, the method further comprises the steps of: selecting a second particular candidate surface design from the set of candidate surface designs, the second particular candidate surface design associated with a second particular article location of the article; generating a second set of additive manufacturing specifications associated with the second particular article location; and additively manufacturing the article to satisfy the second set of additive manufacturing specifications. In another aspect, the set of performance measurements comprise a fluid friction loss value and a heat transfer value. In another aspect, the step of categorizing the set of candidate surface designs with respect to the set of design objectives comprises use of at least one of a Stanton Number value and a Darcy Friction Factor value.

In another embodiment, an article with varied surface topology satisfying a set of article design objectives is disclosed, the article comprising: a first particular article location of the article, the first particular location having a first particular candidate surface design selected from a set of candidate surface designs, the first particular candidate surface design having a first set of additive manufacturing specifications satisfying the set of article design objectives associated with the first particular article location; and a second particular article location of the article, the second particular location having a second particular candidate surface design selected from a set of candidate surface designs, the second particular candidate surface design having a second set of additive manufacturing specifications satisfying the set of article design objectives associated with the second particular article location; wherein: the article is additively manufactured using both the first set of additive manufacturing specifications and the second set of additive manufacturing specifications.

In another aspect, the article is a fluid manifold. In another aspect, the fluid manifold is a Liquid Rocket Engine fluid manifold. In another aspect, the article is an airfoil. In another aspect, the article is a structure defining an enclosed cavity, the first particular candidate surface design formed on a first interior portion of the article and the second particular candidate surface design formed on a second interior portion of the article; and the set of article design objectives comprise: a first fluid friction loss value and a first heat transfer value, each associated with the first interior portion of the article; and a second fluid friction loss value and a second heat transfer value, each associated with the second interior portion of the article. In another aspect, the article is a structure defining an enclosed cavity, the first particular candidate surface design formed on a first exterior portion of the article and the second particular candidate surface design formed on a second exterior portion of the article; and the set of article design objectives comprise: a first fluid friction loss value and a first heat transfer value, each associated with the first exterior portion of the article; and a second fluid friction loss value and a second heat transfer value, each associated with the second exterior portion of the article. In another aspect, the first particular location further comprises a first particular candidate surface manufacturing design selected from a set of candidate surface manufacturing designs. In another aspect, the first particular location further comprises a first particular candidate surface manufacturing design selected from a set of candidate surface manufacturing designs; and the second particular location further comprises a second particular candidate surface manufacturing design selected from a set of candidate surface manufacturing designs. In another aspect, the first particular candidate surface manufacturing design comprises at least one of roughness features and porosity features. In another aspect, the first particular candidate surface design comprises at least one of dimple features and grooved channel features.

The term "fluid" means a substance devoid of shape and yields to external pressure, to include liquids and gases, e.g., fuels or oxidizers in liquid or gaseous form). The fluid may be any gas, liquid, gel, slurry. In one embodiment, multiple fluids are used in multiple flow paths. Flow paths may be parallel, counter, or cross flowing to encourage or discourage heat transfer. In one embodiment, phase change occurs within the device.

The term "topology" means geometric properties, spatial relations, and interrelations of geometric properties and spatial relations.

The phrase "topology optimization" means a method for optimizing material layout within a given design space for a given set of boundary conditions and constraints with the goal of maximizing system performance.

The term "surface" means the outer part or layer of something.

The phrase "surface design" means designs pertaining to the geometrical configuration of a surface, such as grooves, dimples, and the like.

The phrase "surface manufacturing design" means designs or properties on a surface that result during manufacturing, such as porosity, cracking, roughness, and the like.

The term "article" means the component to be manufactured. The article may be any solid material which holds form to interact with fluid flow and is compatible with one or more additive manufacturing methods, including methods where the article is not directly additively manufactured, but where additive manufacturing is used to impart the surface design features, such as an additively manufactured mold with dimples. The article may take the form of a tube, channel, airfoil, fuselage or any other form which may interact with fluid. Common article materials include metals, ceramics, and polymers, but other materials are possible. The method of additive manufacturing allows for a minimum feature size of proper scale relative to the size of the flow path cross-section, such that a multiplicity of features may be patterned across the fluid-interacting surface(s).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that can perform the functionality associated with that element.

The phrase "graphical user interface" or "GUI" means a computer-based display that allows interaction with a user with aid of images or graphics.

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 5 shows a categorization table relative to a set of four candidate surface designs;

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

Figure 1:
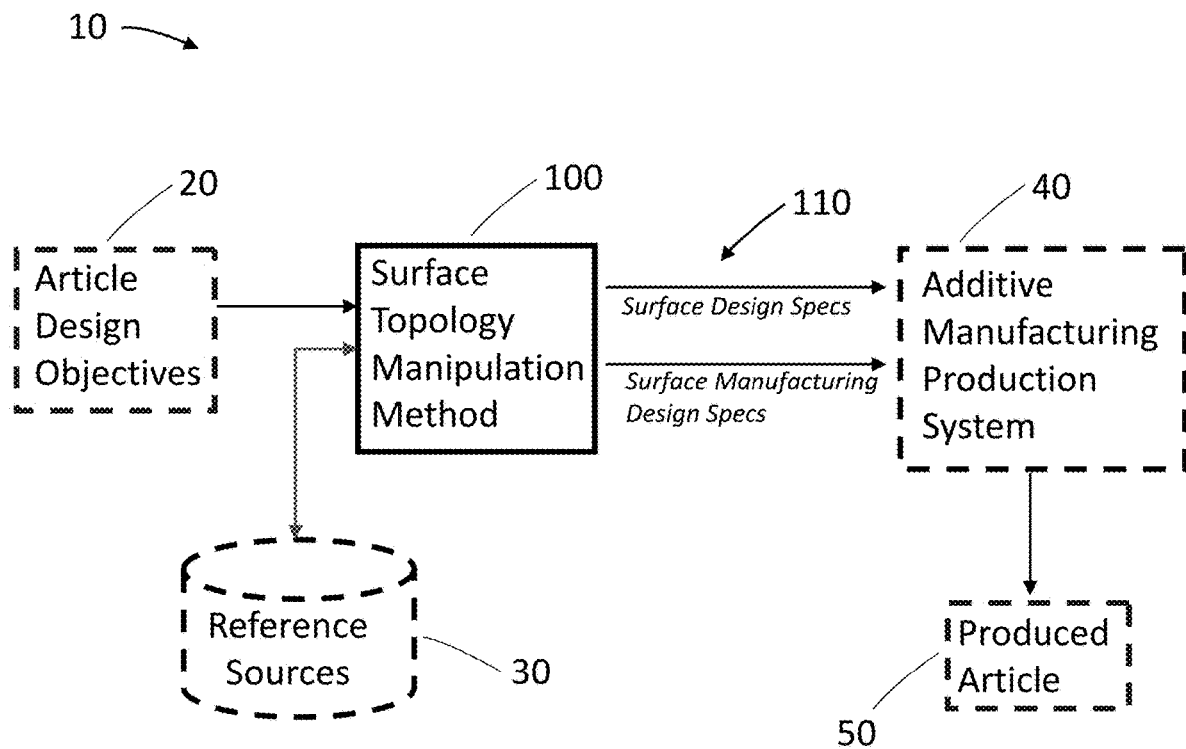
FIG. 1 shows a schematic diagram of one embodiment of a system for manipulating surface topology of fluid-interacting structures.

FIG. 1 shows a schematic diagram of one embodiment of a system for manipulating surface topology of fluid-interacting structures 10. The system for manipulating surface topology of fluid-interacting structures 10 may also be referred to as surface topology system, surface topology manipulation system, or simply system.

The surface topology manipulation system 10 generally considers and determines a set of article design objectives 20, consults or references reference sources 30 as may be required, performs a surface topology manipulation method 100, and generates or produces surface design specifications and/or surface manufacturing design specifications (collectively, additive manufacturing specifications 110) which are provided to an additive manufacturing production system 40 which uses the additive manufacturing specifications 110 to create or manufacture a produced article 50.

The article design objectives 20 may include cooling objectives such as heat transfer values, flow performance objectives such as degree of turbulent or laminar flow, friction values, average wall temperature (for enclosed systems such as cooling channels), pressure drops. Note that the article design objectives 20 may be fixed across the entire article or may vary along or within the article. For example, a set of article design objectives for a cooling channel article may comprise a fixed value or maximum value for pressure drop along the entire longitudinal (axial) length of the cooling channel yet may have a first friction value at a first article location and a second friction value at a second article location. The article design objectives 20 may comprise set values, a range of maximum and minimum values, not to exceed maximum values, not to drop below minimum values, and any type of design objectives known to those skilled in the art.

In one embodiment, one or more of the article design objectives 20 are article design requirements. The phrase "design objective" means a targeted design value that is ideally achieved but is not required to be achieved. The phrase "design requirement" means a targeted design value that is required to be achieved.

The surface topology manipulation method 100 is described in more detail with respect to FIGS. 2 and 3 below.

The additive manufacturing production system 40 may be any additive manufacturing system known to those skilled in the art.

Figure 10A:
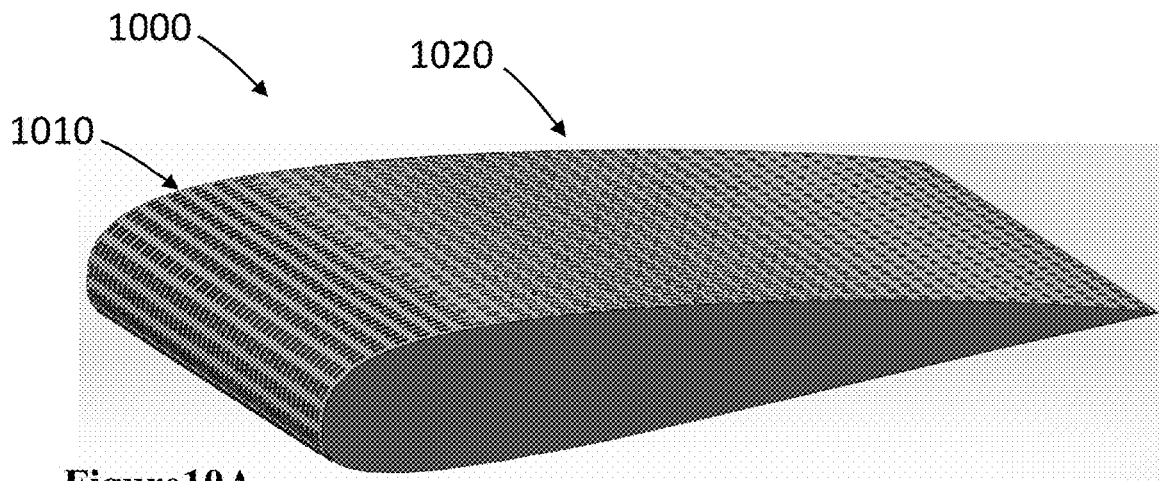
FIG. 10A is a perspective view of an airfoil with portions additively manufactured using the system for manipulating surface topology of fluid-interacting structures of FIG. 1.
Figure 10B:
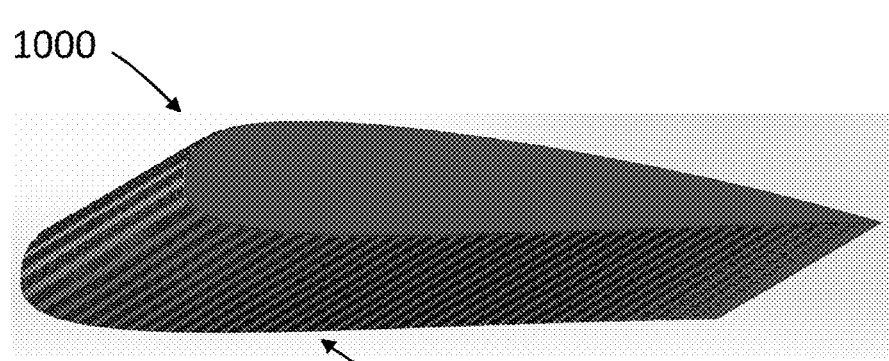
FIG. 10B is another perspective view of the airfoil of FIG. 10B.
Figure 10C:
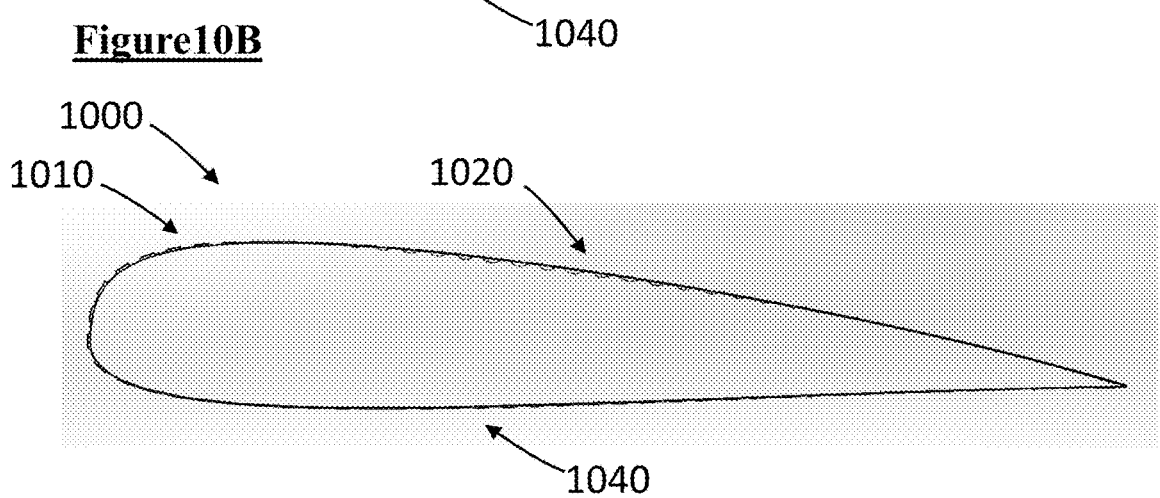
FIG. 10C is a side view of the airfoil of FIG. 10A.

The produced article 50 may be any article which engages with fluid, to include, for example, a cooling channel, a cooling channel of a Liquid Rocket Engine (LRE) such as described in FIGS. 9A-E, and an airfoil, as described in FIGS. 10A-C.

Figure 2:
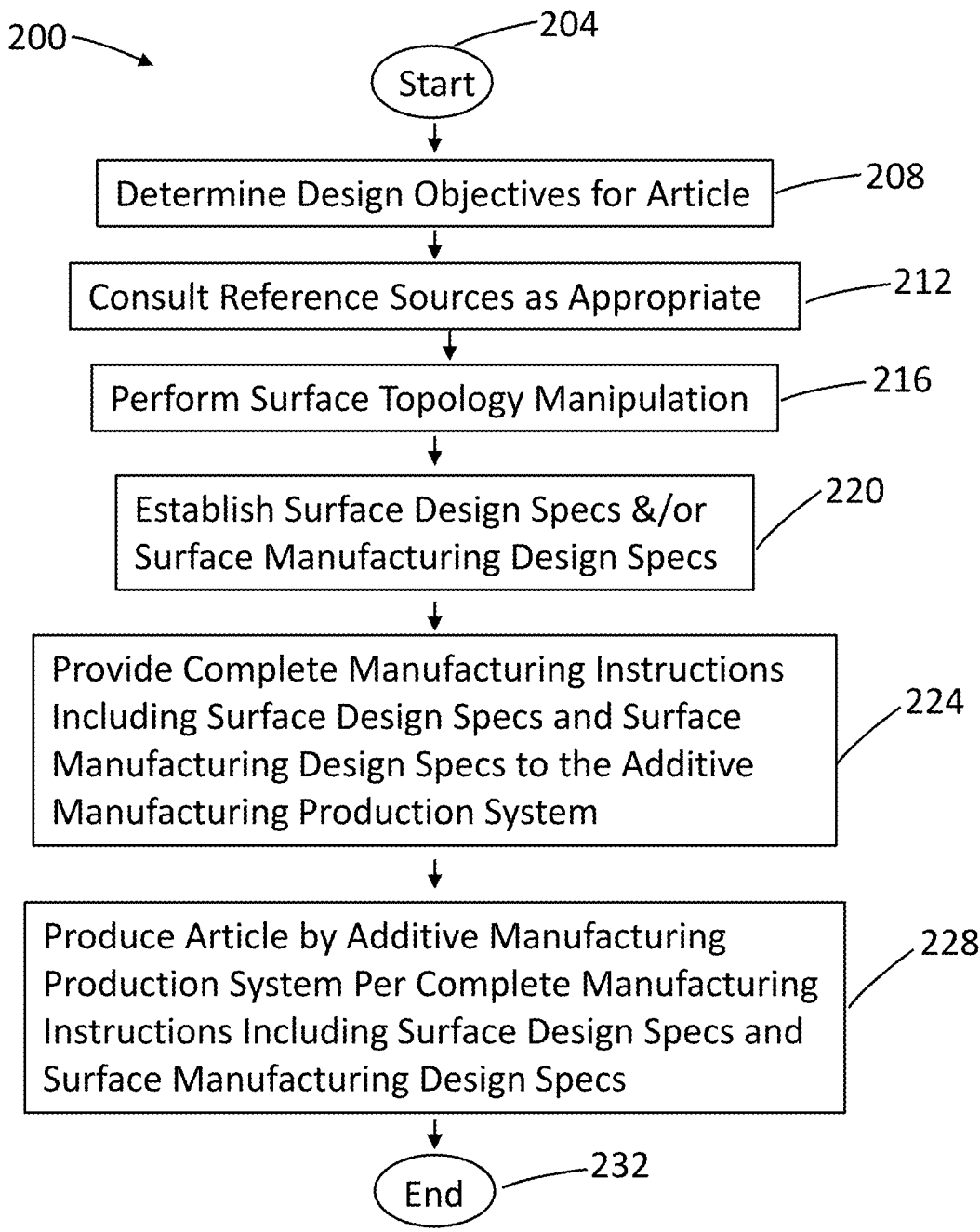
FIG. 2 shows a flowchart of one method of operation of the system for manipulating surface topology of fluid interacting structures of FIG. 1.

FIG. 2 shows a flowchart of one method of operation of the system for manipulating surface topology of fluid-interacting structures 200 of FIG. 1. The method of operation of the system for manipulating surface topology of fluid-interacting structures 200 may also be referred to as the surface topology method, the surface topology manipulation method, the manipulation method, or simply as the method.

In one embodiment of the surface topology manipulation method 200, the system for manipulating surface topology of fluid-interacting structures 10 of FIG. 1 follows the sequence of steps described in FIG. 2. Other methods of use are possible, to include a sequence of steps different than those of FIG. 2, a sequence with additional steps, and a sequence with fewer steps. Also, as will be clear from the below description, elements of the system 10 of FIG. 1, and/or other aspects of a system as described in this disclosure, may be incorporated.

With particular attention to FIG. 2, a flowchart of surface topology manipulation method 200 is provided, the method 200 utilizing the elements described in the systems of FIG. 1.

The method 200 starts at step 204 and ends at step 232. Any of the steps, functions, and operations discussed herein can be performed continuously and automatically. In some embodiments, one or more of the steps of the method 200 may comprise computer control, use of computer processors, and/or some level of automation. The steps are notionally followed in increasing numerical sequence, although, in some embodiments, some steps may be omitted, some steps added, and the steps may follow other than increasing numerical order.

At step 208, the surface topology manipulation method 200 receives a set of design objectives for the article, as described above. The design objectives may be a set of design objectives and may comprise values fixed for the entire article or variable with location on or within the article. After completion of step 208, the method 200 continues to step 212.

At step 212, the method consults reference sources as may be appropriate. For example, the method may consult operating procedures for the particular type of additively manufacturing production system 40 employed, so as to achieve one or more targeted design objectives.

In one aspect, a designer may access one or more reference guides which contain test data of many features at different sizes in different flow regimes. The designer may choose different features and sizes for different points along the article's flow path to elicit the desired performance at every differential length along the flow path. The designer may functionally vary the form of the features along the path, or may intermix features at the same scale, such as interspaced dimples and fins, or intermix features at different scales, such as fins with small dimples on them. In another aspect, a designer may use Computational Fluid Dynamics to simulate the flow in the device and iteratively impart features into the design to locally optimize performance over multiple simulations.

After completion of step 208, the method 200 continues to step 216.

At step 216, the method 200 performs the surface topology manipulation method, as described in more detail with respect to FIG. 3 below. After completion of step 208, the method 200 continues to step 220.

At step 220, the method 200 established surface design specifications and/or surface manufacturing design specifications (collectively, the additive manufacturing specifications 110) that define the surface topology defined or selected in step 216. After completion of step 220, the method 200 continues to step 224.

At step 224, the method 200 provides the complete set of additive manufacturing specifications 110 to the additive manufacturing system 40. After completion of step 224, the method 200 continues to step 228.

At step 228, the method 200, by way of the additive manufacturing system 40 with use of the complete set of additive manufacturing specifications 110, produces the additive manufactured article. After completion of step 228, the method 200 ends at step 232.

Figure 3:
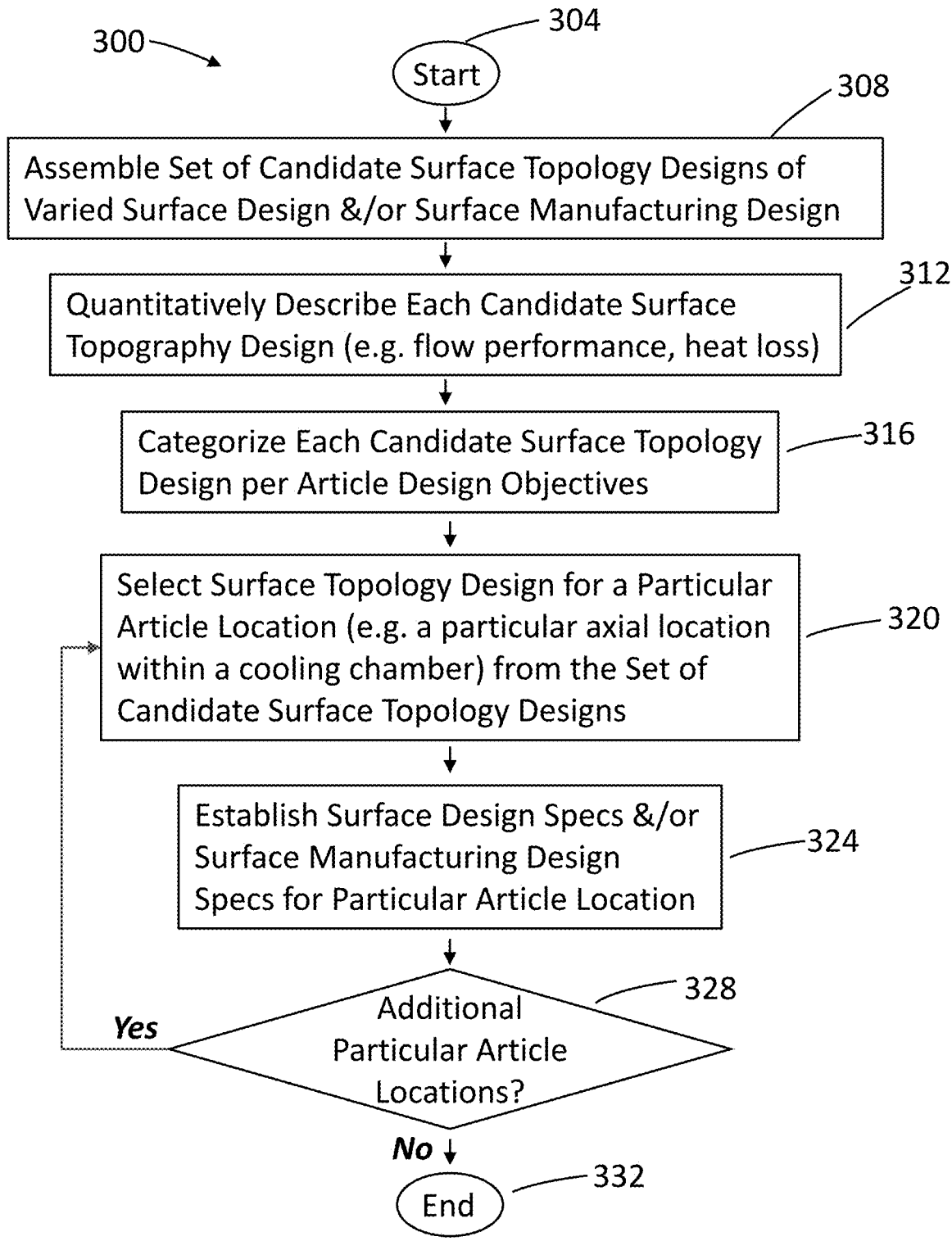
FIG. 3 shows a more detailed flowchart of some aspects of the method of operation of the system for manipulating surface topology of fluid interacting structures of FIG. 2.
Figure 4A:
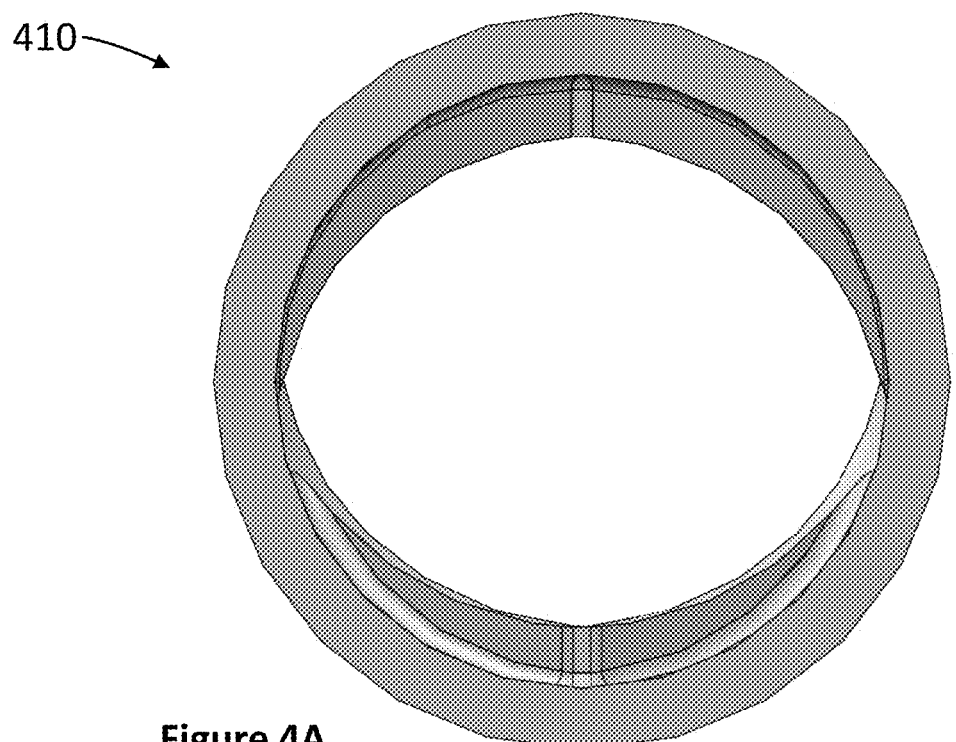
FIG. 4A shows a see through perspective end view of a first candidate surface design applied within a cooling channel of the system for manipulating surface topology of fluid-interacting structures of FIG. 1.
Figure 4B:
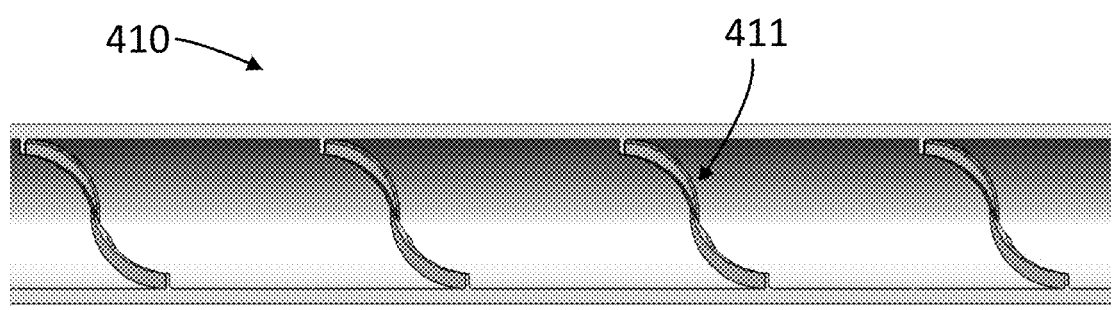
FIG. 4B shows a cut-away side view of the first candidate surface design of FIG. 4A.
Figure 4C:
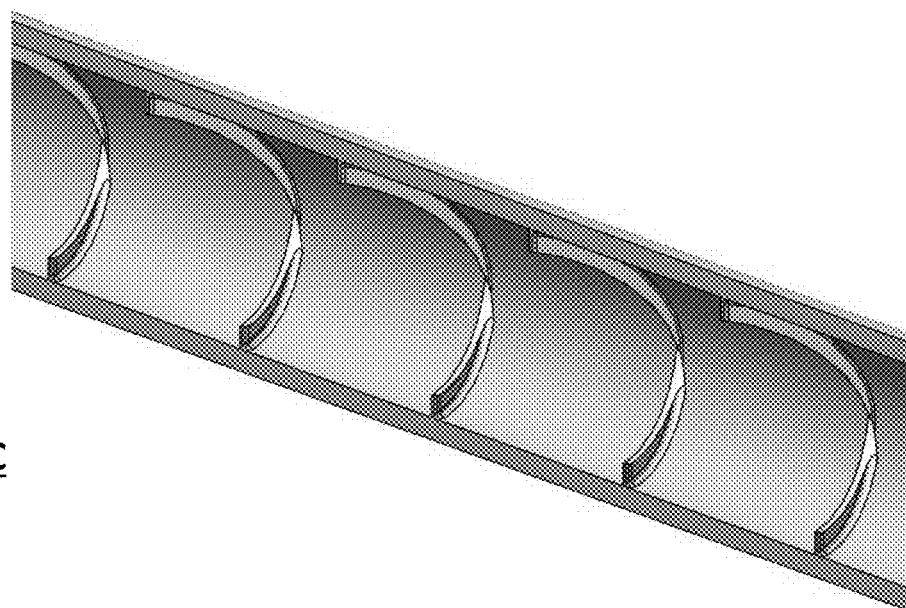
FIG. 4C shows a cut-away side perspective view of the first candidate surface design of FIG. 4A.
Figure 4D:
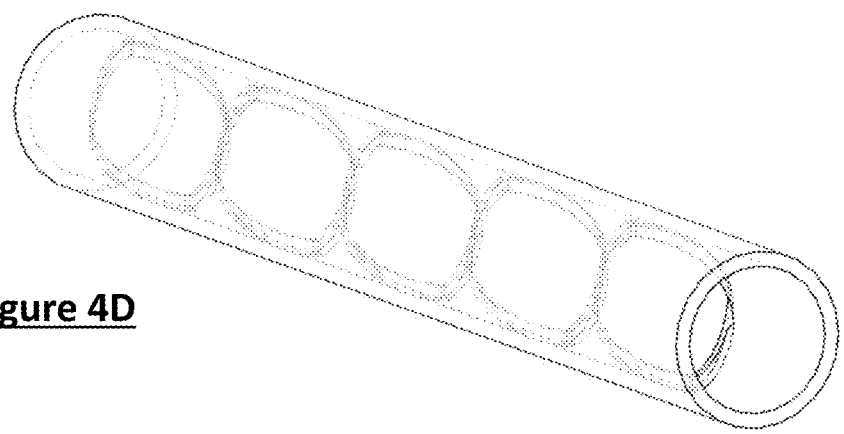
FIG. 4D shows a see through perspective side view of the first candidate surface design of FIG. 4A.
Figure 4E:
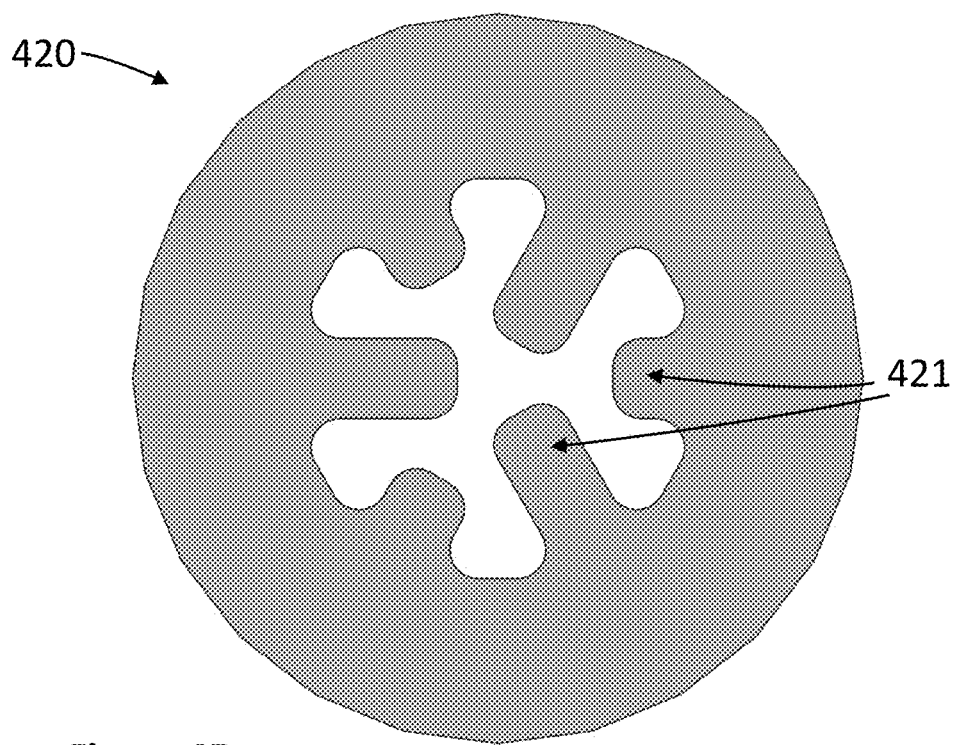
FIG. 4E shows an end view of a second candidate surface design applied within a cooling channel of the system for manipulating surface topology of fluid-interacting structures of FIG. 1.
Figure 4F:
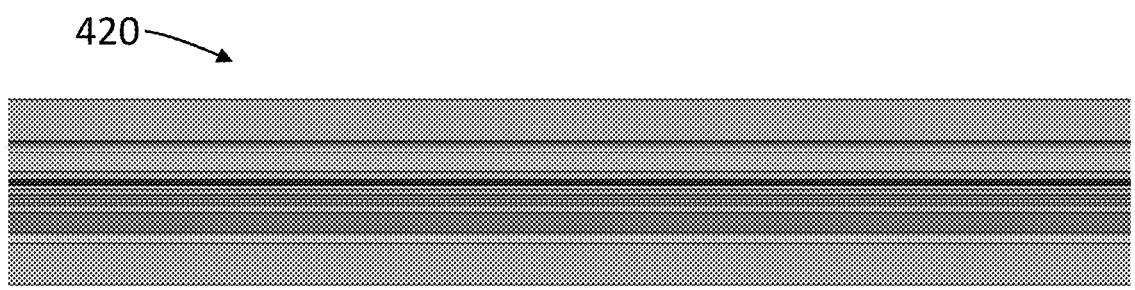
FIG. 4F shows a cut-away side view of the second candidate surface design of FIG. 4E.
Figure 4G:
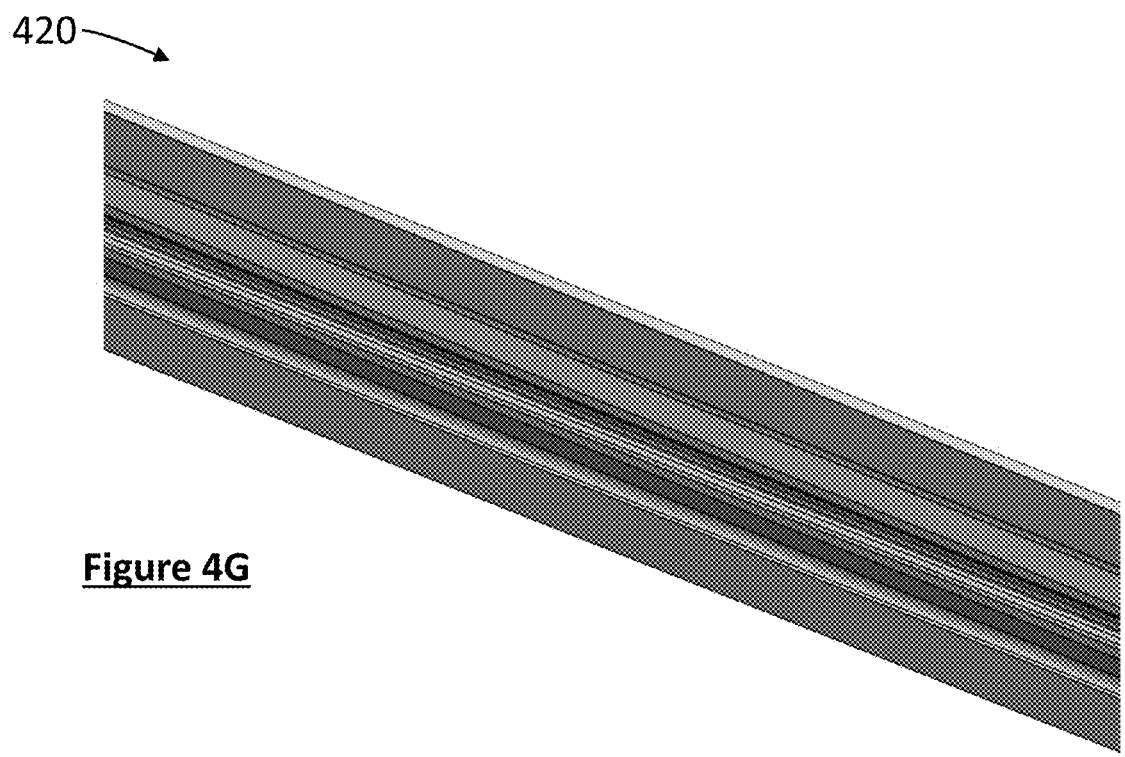
FIG. 4G shows a cut-away side perspective view of the first candidate surface design of FIG. 4E.
Figure 4H:
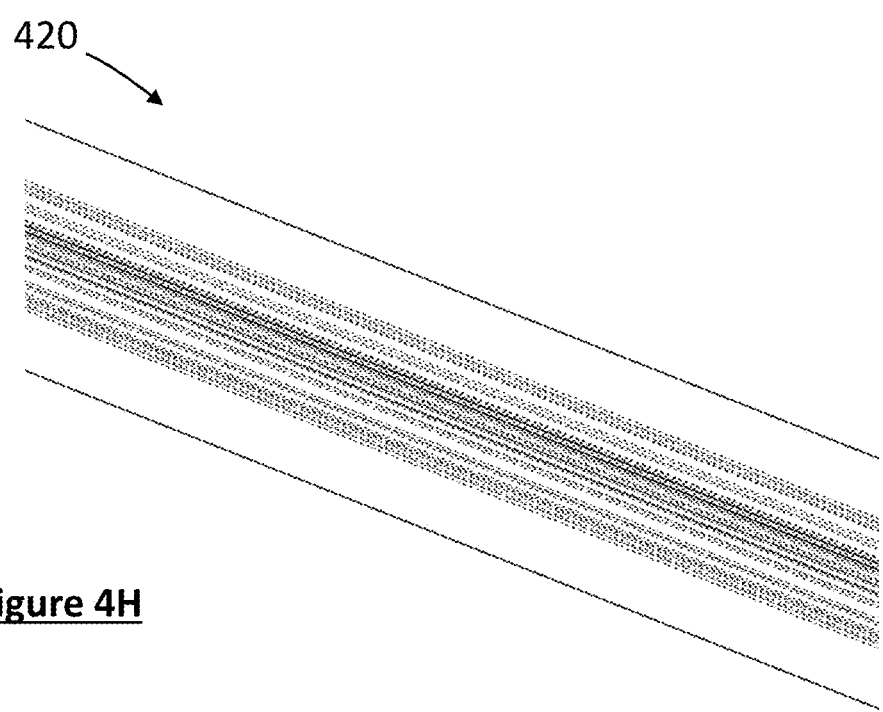
FIG. 4H shows a see through perspective side view of the first candidate surface design of FIG. 4E.
Figure 4J:
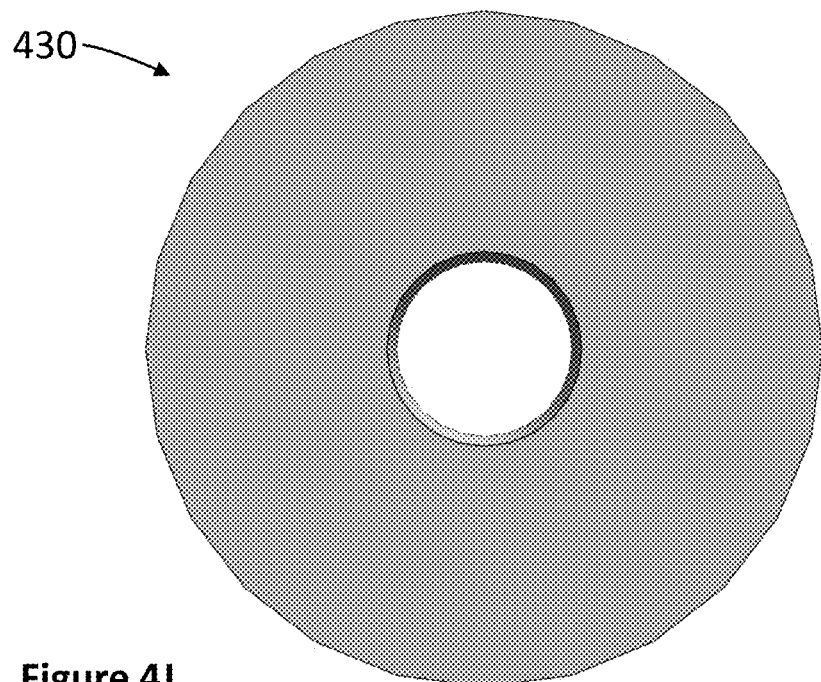
FIG. 4J shows a perspective end view of a third candidate surface design applied within a cooling channel of the system for manipulating surface topology of fluid-interacting structures of FIG. 1.
Figure 4K:
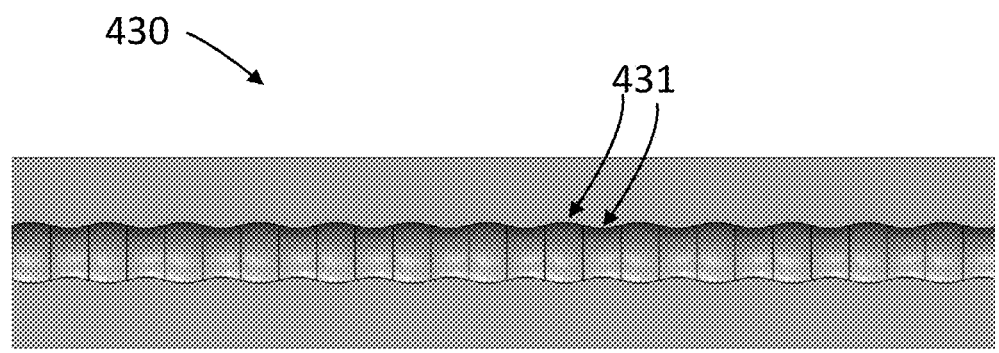
FIG. 4K shows a cut-away side view of the third candidate surface design of FIG. 4J.
Figure 4L:
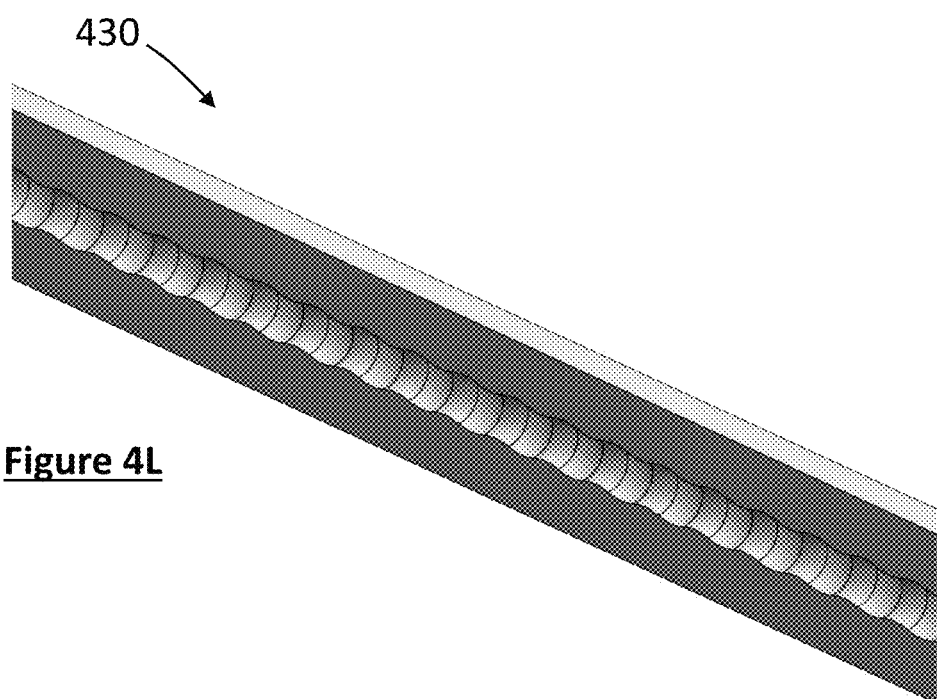
FIG. 4L shows a cut-away side perspective view of the third candidate surface design of FIG. 4J.
Figure 4M:
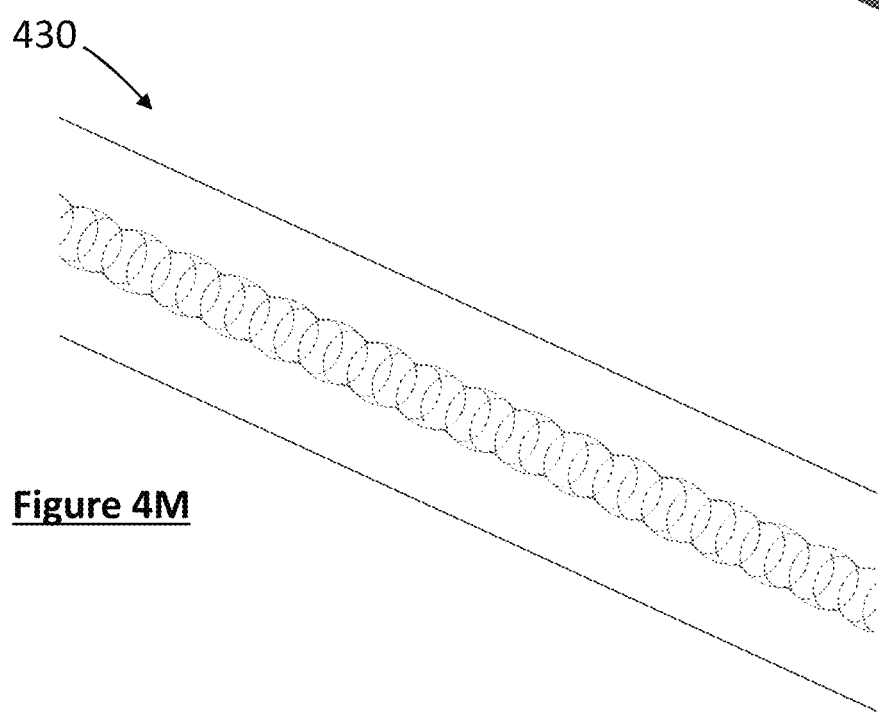
FIG. 4M shows a see through perspective side view of the third candidate surface design of FIG. 4J.
Figure 4P:
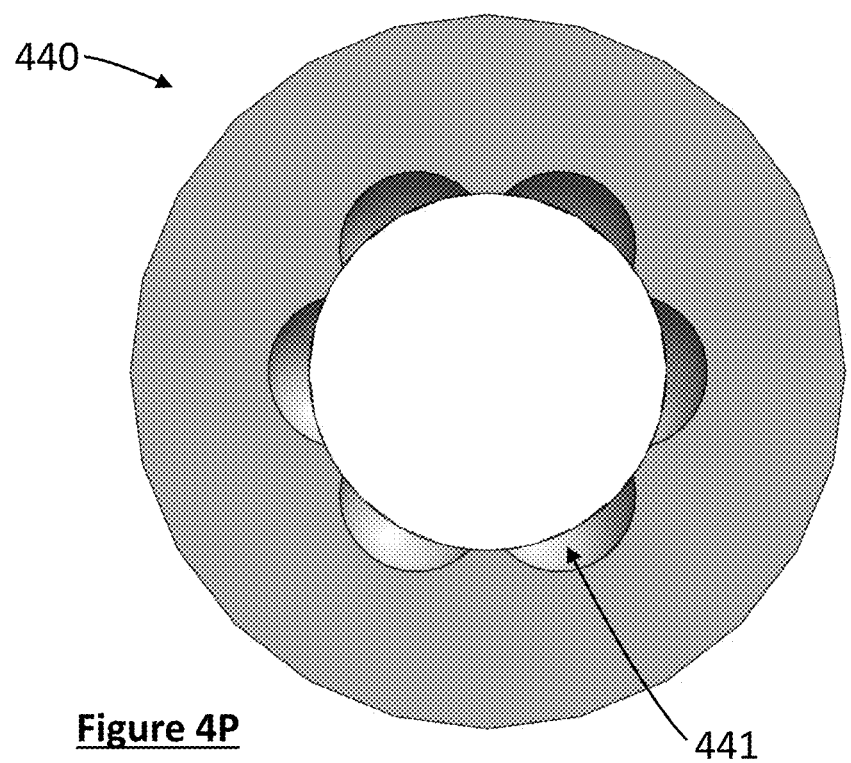
FIG. 4P shows a perspective end view of a fourth candidate surface design applied within a cooling channel of the system for manipulating surface topology of fluid-interacting structures of FIG. 1.
Figure 4Q:
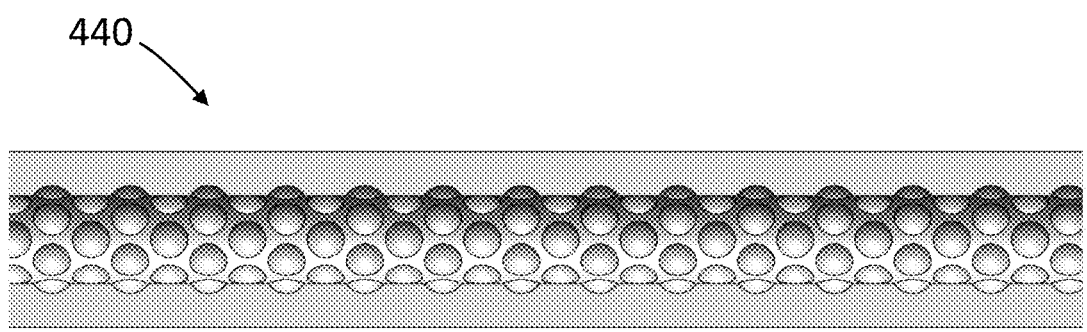
FIG. 4Q shows a cut-away side view of the fourth candidate surface design of FIG. 4P.
Figure 4R:
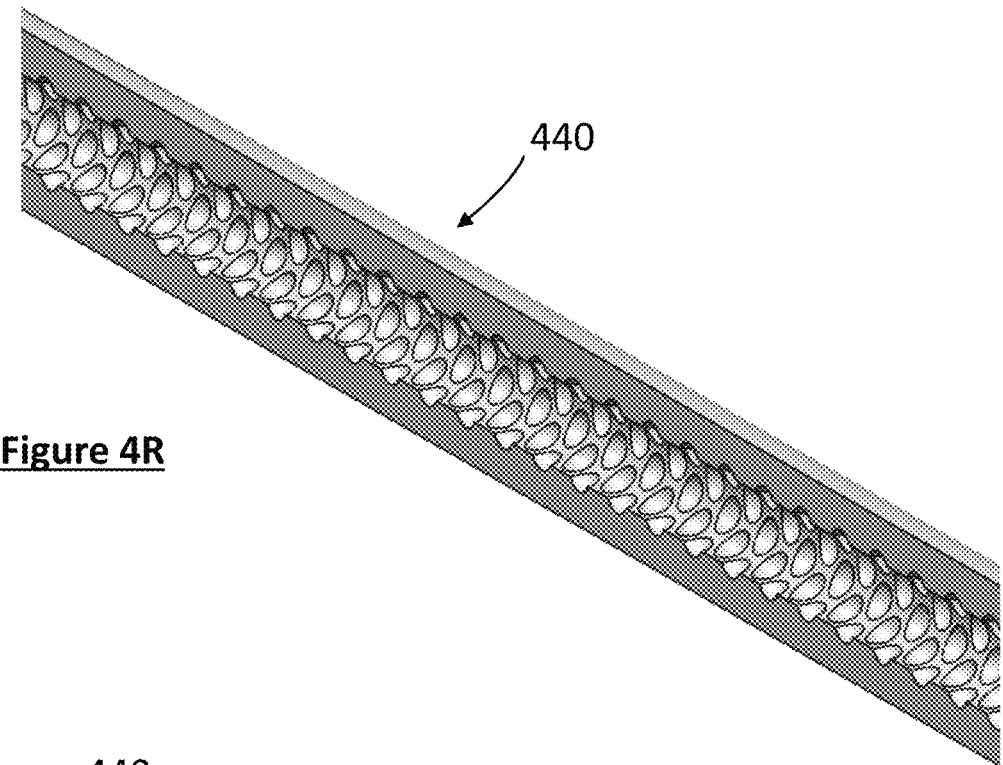
FIG. 4R shows a cut-away side perspective view of the fourth candidate surface design of FIG. 4P.
Figure 4S:
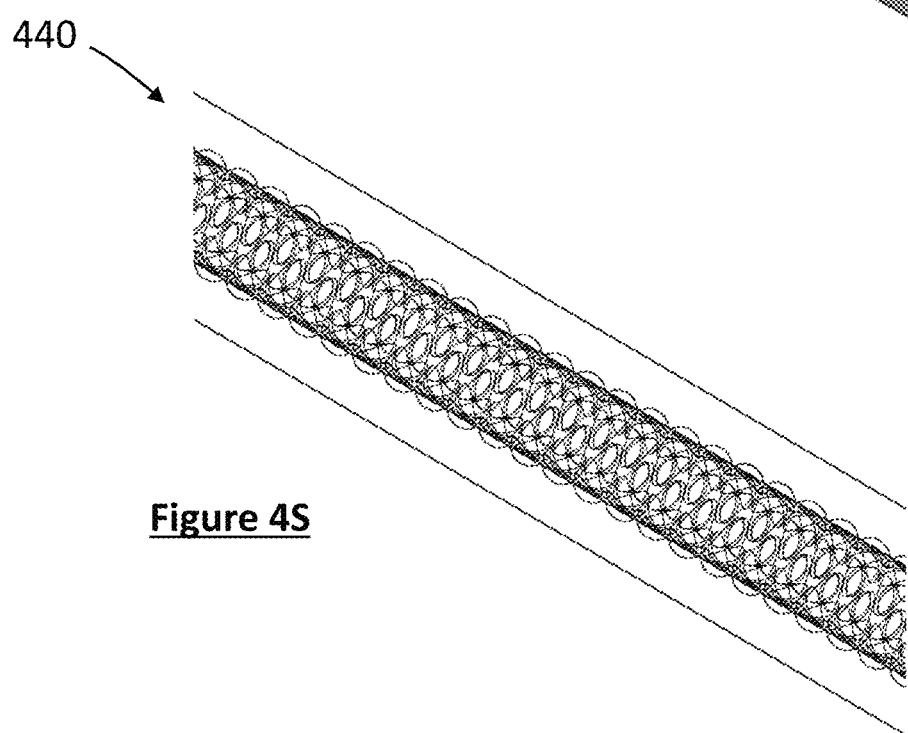
FIG. 4S shows a see through perspective side view of the fourth candidate surface design of FIG. 4P.
Figure 4T:
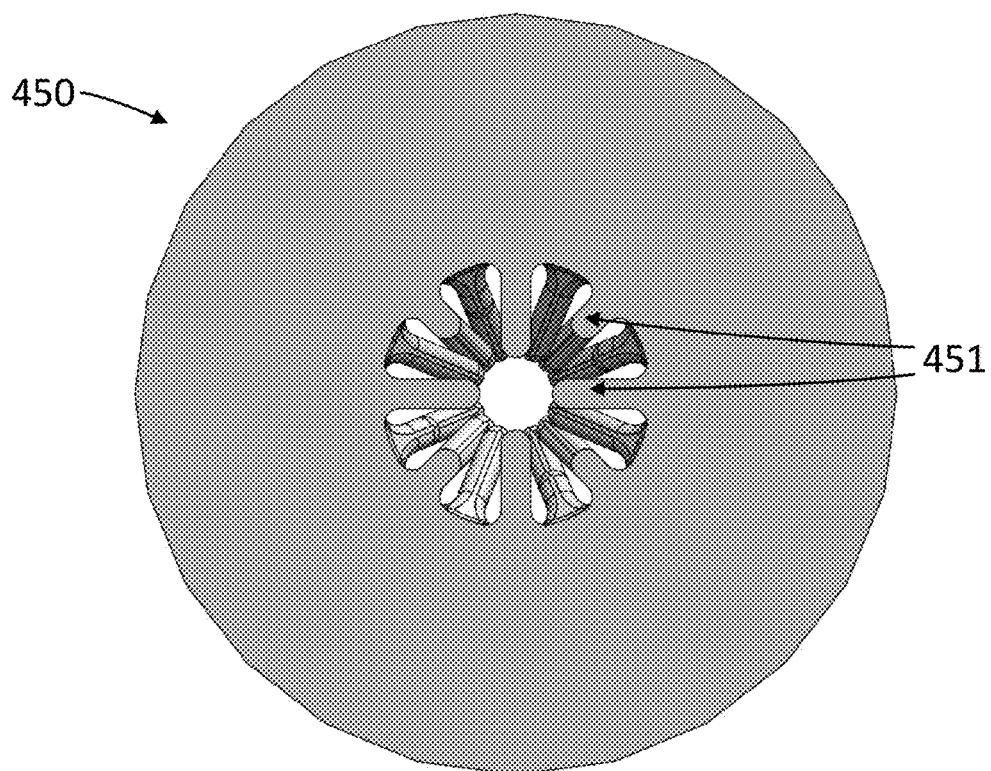
FIG. 4T shows a perspective end view of a fifth candidate surface design applied within a cooling channel of the system for manipulating surface topology of fluid-interacting structures of FIG. 1.
Figure 4U:
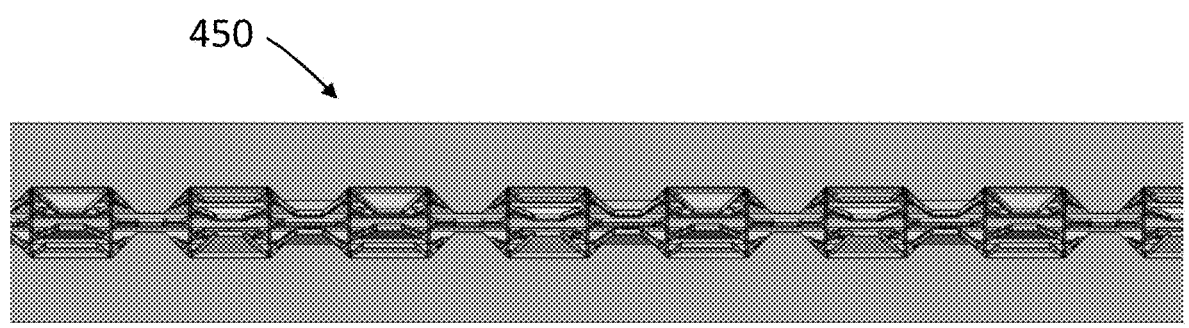
FIG. 4U shows a cut-away side view of the fifth candidate surface design of FIG. 4T.
Figure 4V:
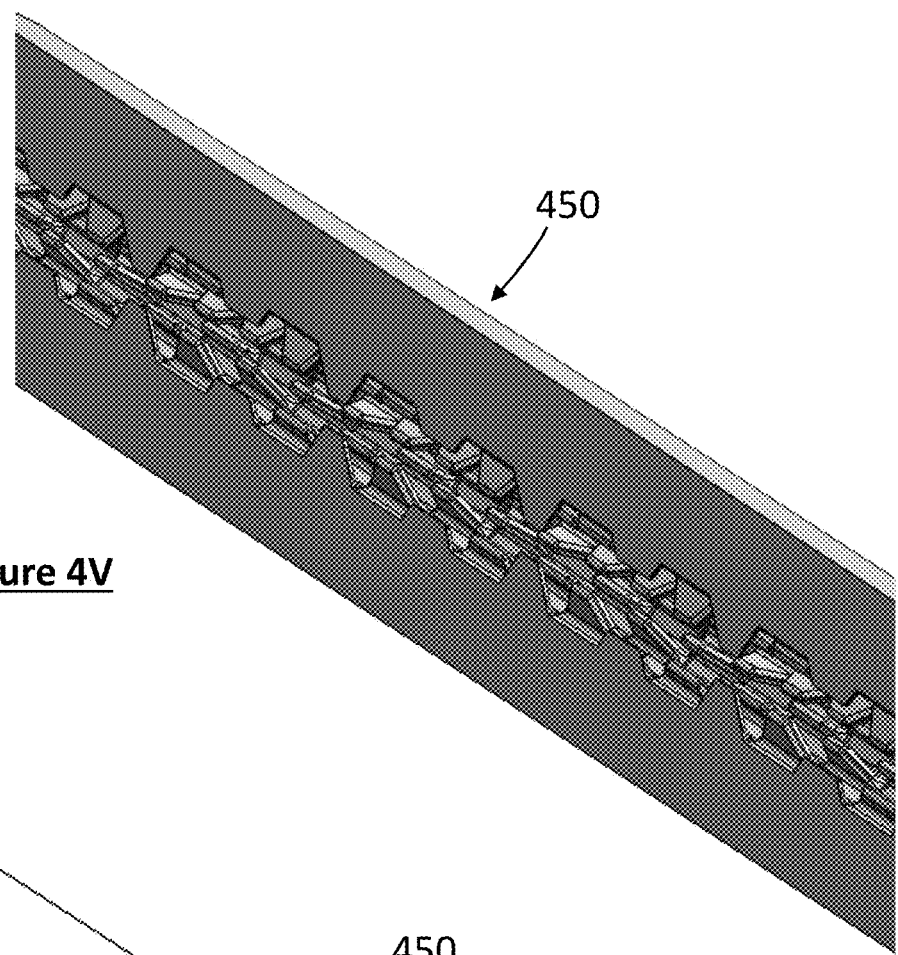
FIG. 4V shows a cut-away side perspective view of the fifth candidate surface design of FIG. 4T.
Figure 4W:
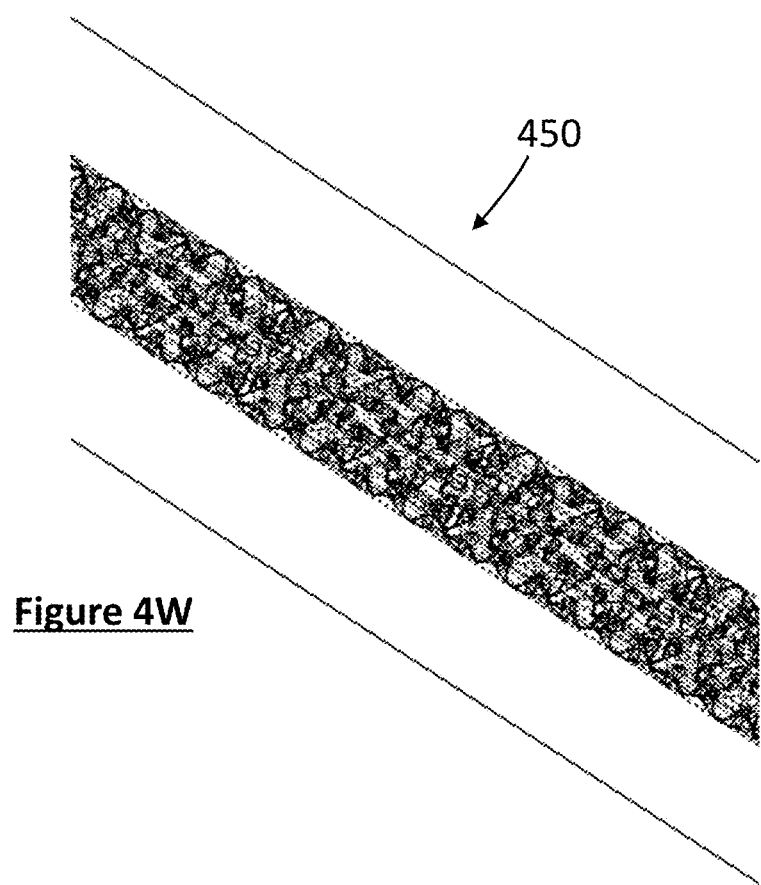
FIG. 4W shows a see through perspective side view of the fifth candidate surface design of FIG. 4T.

FIG. 3 shows a more detailed flowchart of some aspects of the method of operation of the system for manipulating surface topology of fluid-interacting surfaces of FIG. 2. More specifically, FIG. 3 expands on the step 216 of FIG. 2. In one embodiment of the method 300 of FIG. 3, the method 300 follows the sequence of steps described in FIG. 3. Other methods of use are possible, to include a sequence of steps different than those of FIG. 3, a sequence with additional steps, and a sequence with fewer steps. Also, as will be clear from the below description, elements of the system 10 of FIG. 1, and/or other aspects of a system as described in this disclosure, may be incorporated.

The method 300 starts at step 304 and ends at step 332. Any of the steps, functions, and operations discussed herein can be performed continuously and automatically. In some embodiments, one or more of the steps of the method 200 may comprise computer control, use of computer processors, and/or some level of automation. The steps are notionally followed in increasing numerical sequence, although, in some embodiments, some steps may be omitted, some steps added, and the steps may follow other than increasing numerical order.

At step 308, the method 300 assembles a set of candidate surface topology designs. Each candidate surface topology design may include a surface design and/or a surface manufacturing design. Generally, a surface design refers to geometrical shapes or patterns on the surface or just below the surface, such as dimples, anti-dimples, etc. as described elsewhere in the disclosure. Generally, a surface manufacturing design refers to features imparted to the article surface by the additive manufacturing process, such as surface porosity, surface roughness, surface cracking etc. as described elsewhere in the disclosure. FIGS. 4A-D present an example set of four (4) surface designs, each for a cooling channel application. After completion of step 308, the method 300 continues to step 312.

At step 312, the method 300 quantitatively describes each of the set of candidate surface topology designs, such as by flow performance, heat loss, etc. FIG. 5 presents an example of quantitative description of the example set of four (4) surface designs presented as FIGS. 4A-D. After completion of step 312, the method 300 continues to step 316.

At step 316, the method 300 categorizes each of the candidate surface topology designs. FIG. 5 presents an example such categorization for the set of four (4) surface designs of FIGS. 4A-D. After completion of step 316, the method 300 continues to step 320.

At step 320, the method 300 selects a particular surface topology design for a particular article location (e.g., for a particular axial location within a cooling chamber) from the set of candidate surface topology designs. As provided in FIG. 5, a ranking score 528 is presented which enables the selection of a particular surface topology design (here, the Design A 512). After completion of step 320, the method 300 continues to step 324.

At step 324, the method 300 establishes or generates a set of surface design specifications and/or surface manufacturing design specifications (collectively, additive manufacturing specifications 110) for a particular article location. (Note that the set of additive manufacturing specifications 110 are provided to the additive manufacturing production system 40). After completion of step 324, the method 300 continues to step 328.

At step 328, the method 300 queries as if additional particular article locations are manipulated for surface topology. (An article may have different performance-related needs at different points along a flow path or in different flow paths). If the response is YES, the method 300 continues to step 320. If the response is NO, the method 300 continues to step 332 and ends.

To illustrate a scenario in which more than one particular article locations are manipulated for surface topology, consider e.g., a liquid rocket engine with a counterflowing regenerative heat exchanger. The rocket engine consists of a combustion chamber, a throat, and an expansion nozzle which contain the combustion, create supersonic flow, and expel combustion products through the nozzle. A heat exchanger lines the outside of the engine, flowing from the nozzle, past the throat, and past the combustion chamber, counter to the direction of combusted propellant flow. The engine is heated by the combustion flow, which is by far its hottest at the throat. The engine will perform better with hotter combustion; however, it is possible that heat from combustion will melt the engine wall or degrade the coolant on the other side. The engine will also perform better with reduced flow friction.

For the combustion flow, a designer may want to choose features which both decrease flow friction and insulate against heat transfer to prevent overheating of the engine structure. At the throat, where heating is the greatest, the designer would prioritize the features which insulate against heat transfer over those which decrease flow friction.

For the coolant flow, the designer may want features which both decrease flow friction and increase heat transfer. The designer would prioritize features which increase heat transfer at the throat to provide the most effective cooling. In a truly optimal design, functional variation of form and intermixing of features would both minimize flow friction as much as possible and create an overall thermal profile such that the maximum material performance is used at every differential length. Knowing how the material performance degrades with temperature, how the strength needed to contain a constant pressure flow varies with pipe diameter (larger diameter needs more strength) and the geometry of the devices, the thermal profile can be designed such that the same material strength margin (factor of safety) can be used at all points along the length of the device, despite a different temperature and diameter at each differential length of the combustion flow path, using smooth functional variation of the features.

In this optimization there are more complex considerations including how cooling performance decreases as coolant temperature increases (i.e., as the coolant is used for cooling), phase change of a liquid coolant in to a gas, and the different cooling performance in the liquid, boiling liquid, and gas regimes. Even with these additional complex effects, it is possible through multiple methods for a designer to arrive at a co-optimization of every differential length, resulting in total optimization of the system. In another embodiment, a similar co-optimization or pareto-optimization is performed for different parameters of concern which may have different profiles along a different manifold configuration. A similar philosophy of optimization with differing priorities will drive the co-optimization to a similar state regarding parameters of interest.

FIGS. 4A-D, 4E-H, 4J-M, 4P-S, and 4T-W show a sequence of five (5) candidate surface designs, each applied within a cooling channel.

FIGS. 4A-D depict a first design 410, termed a boundary scoop design. The design 410 comprises a series of twisted rings 411 extending from an interior surface of the cooling channel.

FIGS. 4E-H depict a second design 420, termed a constant fin design. The design 420 comprises a series of fins 421 extending from an interior surface of the cooling channel.

FIG. 4J-M depict a third design 430, termed a corrugated design. The design 430 comprises a series of expansions and contractions 431 to the interior diameter of the cooling channel.

FIG. 4P-S depict a fourth design 440, termed a dimple design. The design 440 comprises a series of dimples 441 that extend into an interior surface of the cooling channel.

FIG. 4T-W depict a fifth design 450, termed a multi-fin design. The design 450 comprises a series of fins 451 extending from an interior surface of the cooling channel.

FIG. 5 shows a categorization table relative to a set of four candidate surface designs of as against a reference additively manufactured (AM) channel. The four candidate surface design columns provide quantitative values associated with each of the four designs. The four designs are provided as a set of four rows.

The four designs as presented as: first row as design A 512, second row as design B, third row as design C, and fourth row as design D 518. Column two provides a value of decrease in delta Pressure or dP, a ratio of the particular advanced concept value to the traditional geometry value. For example, the value of 3.28 (intersection of row 512 and column 522) is the pressure drop of design A divided by the pressure drop of the reference AM cylindrical channel. Because design A had a much higher pressure drop, the ratio is greater than 1 (i.e., actual value of 3.28); this is undesirable because an increase in pressure drop is undesirable for the system, per design objectives. A value of less than 1 (indicating that the advanced concept had a lower pressure drop than the traditional geometry) is desirable (for the Decrease dP column). For example, with reference to the intersection of row 514 and column 522, a value of dP of 0.60 is provided for design B. The same logic applies for the "Decrease C" column—the values in this column are a ratio of the advanced concept total carbon deposition and the traditional geometry total carbon deposition. A value of less than one means the advanced concept deposited less carbon, a desirable attribute. A value greater than one means the advanced concept deposited more carbon than the traditional geometry, an undesirable attribute. For the "Increase Nu" column, the relative value to 1 is reversed, meaning that values greater than 1 are desirable. An increase in Nusselt Number was a design objective for the advanced concepts as it indicates an increase in heat transfer relative to the baseline traditional AM cylindrical channel (a value less than 1 is undesirable as it indicates a decrease in heat transfer when compared to the traditional geometry). Column 528 provides a relative score of the four designs based on a selectable weighting of each of the associated three quantitative values (decrease in dP, increase in Nu, and decrease in C). The value of 1 for design A indicates that it is the superior design in the illustrated scenario and therefore would become the selected surface design for the set of four candidate surface designs considered.

Figure 6:
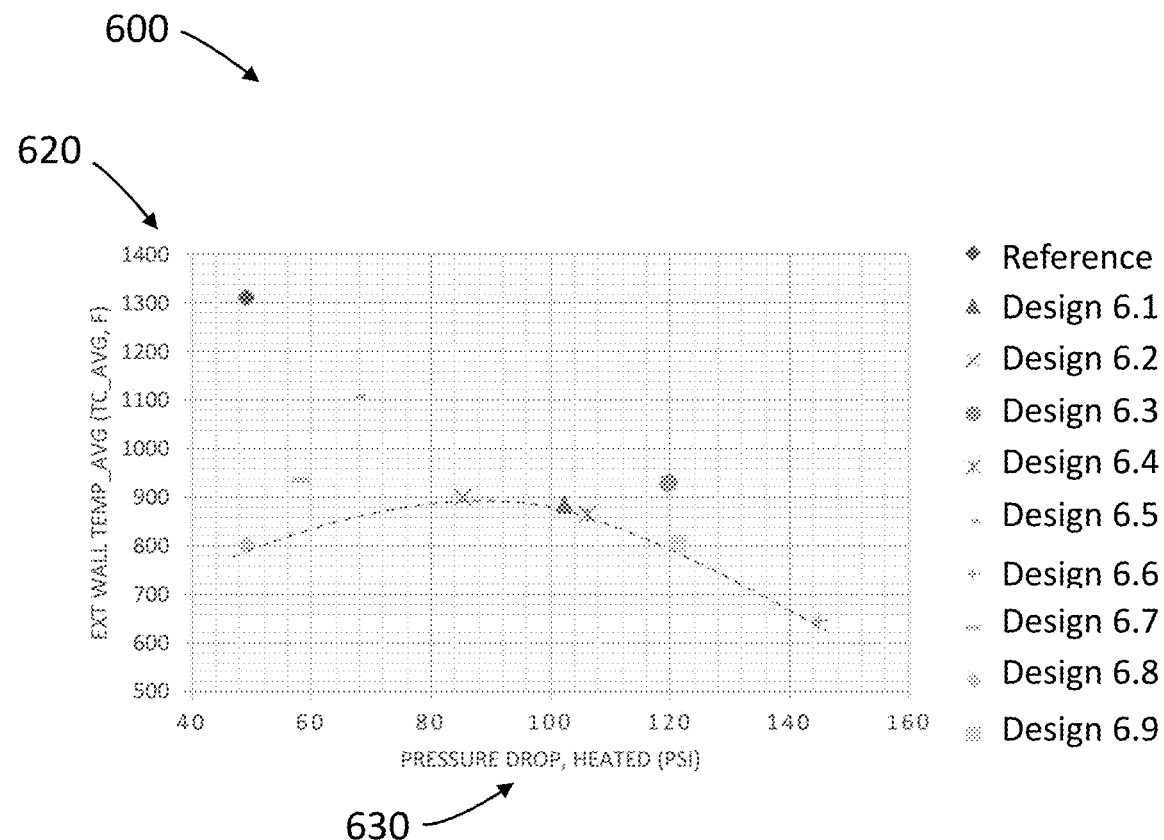
FIG. 6 shows a comparison graph of pressure drop vs. average wall temperature for a set of ten (10) candidate surface designs, each candidate surface design applied within a cooling channel.

FIG. 6 shows a comparison graph of pressure drop vs. average wall temperature for a set of nine (9) candidate surface designs, each candidate surface design applied within a cooling channel. The results were experimentally obtained by flowing RP-2 kerosene fuel through a resistively heated cooling channel with thermocouples spaced along the length and pressure measurements taken at the article entrance and exit. The nine (9) candidate surface designs (designs 6.1 through 6.9) are compared against baseline drawn cylinder design 6.0.

The average wall temp (from 8 thermocouples) and average pressure drop are shown without major outliers. The baseline design, marked with a short dash, is an additively manufactured tube with a plain circular cross-section. Designs to the left of the baseline design showed improved pressure loss, designs below it show improved heat transfer. The dashed curve shows a pareto front, highlighting the most optimal designs in the design space. This assumes that the designs are comparable 1-to-1, which is an approximation due to variation in hydraulic diameter between the tested article design.

Figure 7:
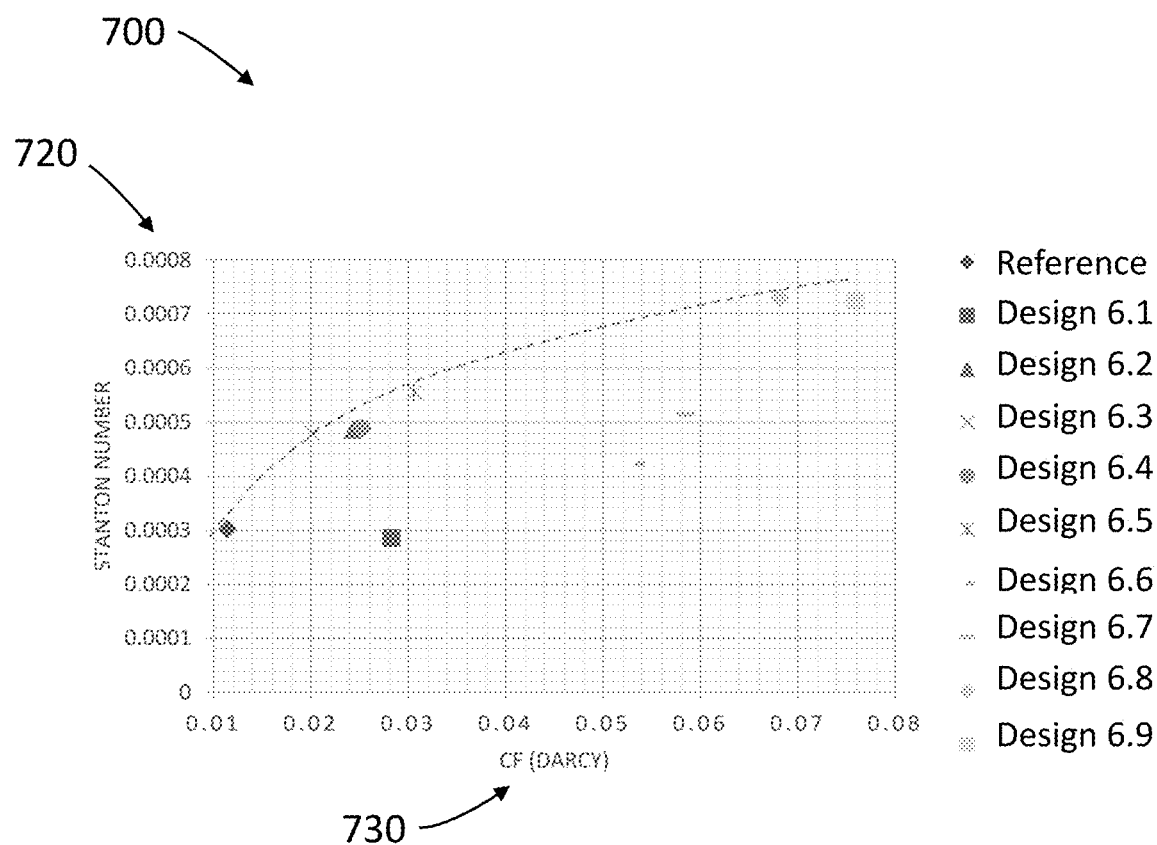
FIG. 7 shows a comparison graph of Stanton Number vs. Darcy Friction Factor for a set of ten (10) candidate surface designs, each candidate surface design applied within a cooling channel.

FIG. 7 shows a comparison graph of Stanton Number vs. Darcy Friction Factor for a set of nine (9) candidate surface designs, each candidate surface design applied within a cooling channel. The results were calculated from the experimentally obtained results in FIG. 6 using geometric information about the article designs. Like FIG. 6, the nine (9) candidate surface designs (designs 6.1 through 6.9) are compared against baseline drawn cylinder design 6.0.

Stanton number vs Darcy friction factor may be used for comparing non-dimensional fluid parameters for the set of candidate flow tube designs. Stanton number is the ratio of heat input into a fluid to the heat capacity. Darcy friction factor normalizes pipe/channel flow friction given hydraulic diameter, relative roughness, and Reynolds number. Similar to the plot of wall temp vs dP in FIG. 6, the short dash marker is the baseline design, a plain additively manufactured cylindrical tube. Ideal designs increase Stanton number and decrease Darcy friction factor. The pareto front (dashed curve) identifies designs that co-optimize Stanton number and Darcy friction factor.

It is noted that the hydraulic diameter of an article is an average value and that abstracted numbers may not be perfectly representative. It is also noted that the non-normalized values in FIG. 6 may be influenced by variations in electrical resistivity, variations in wall thickness, and other factors like different average hydraulic diameters.

Figure 8:
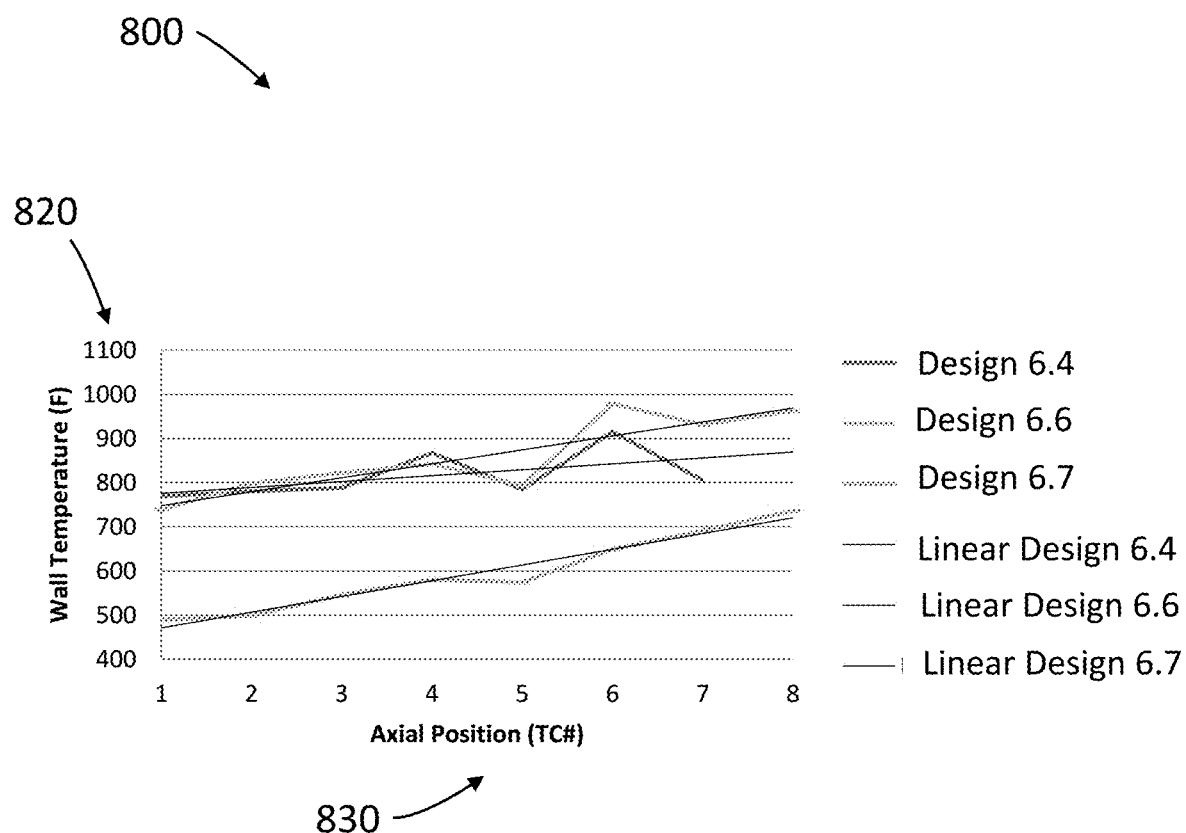
FIG. 8 shows a comparison graph of Wall Temperature vs. Axial Position for a set of three (3) swirl inducing channel designs, each candidate surface design applied within a cooling channel.
Figure 9A:
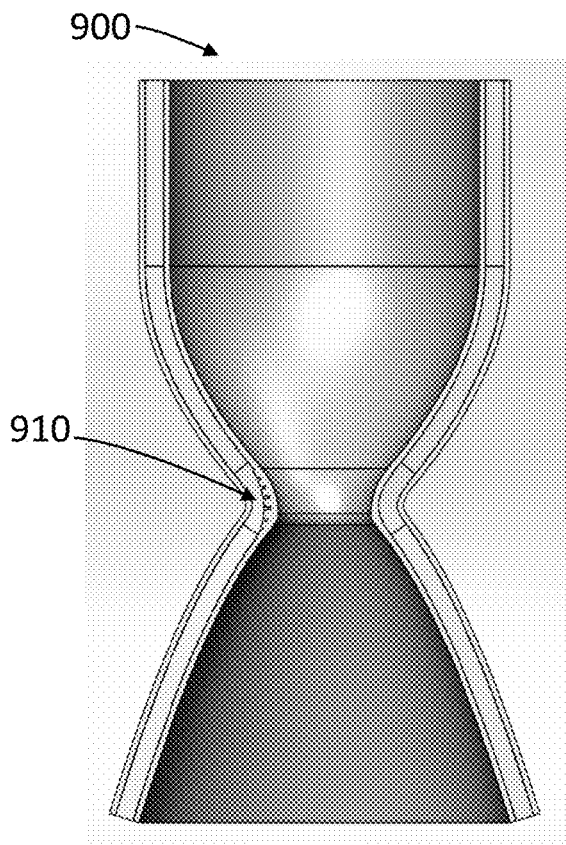
FIG. 9A shows a cut-away side view of one embodiment of a Liquid Rocket Engine with portions additively manufactured using the system for manipulating surface topology of fluid-interacting structures of FIG. 1.
Figure 9B:
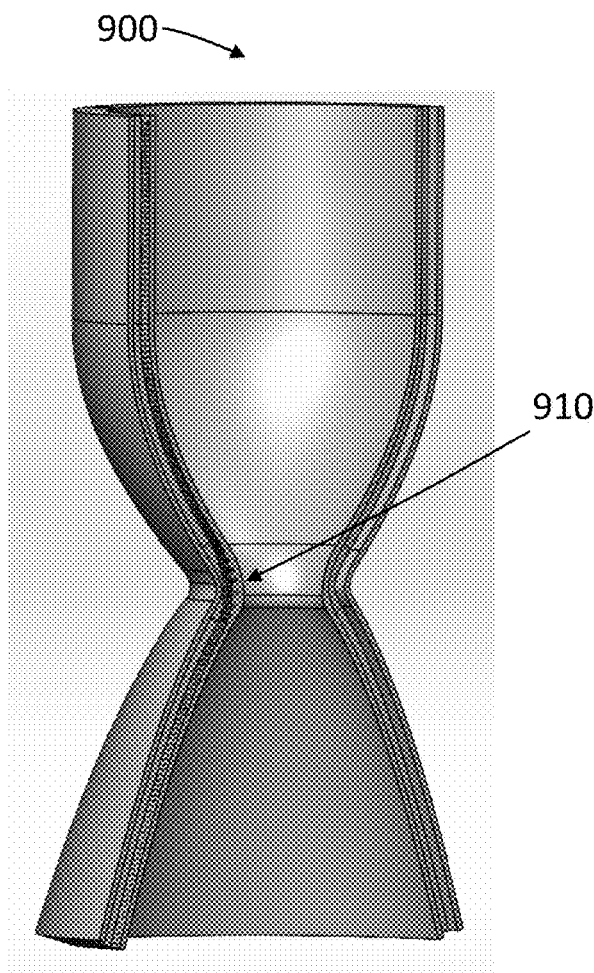
FIG. 9B is another cut-away side view of the Liquid Rocket Engine of FIG. 9A.
Figure 9C:
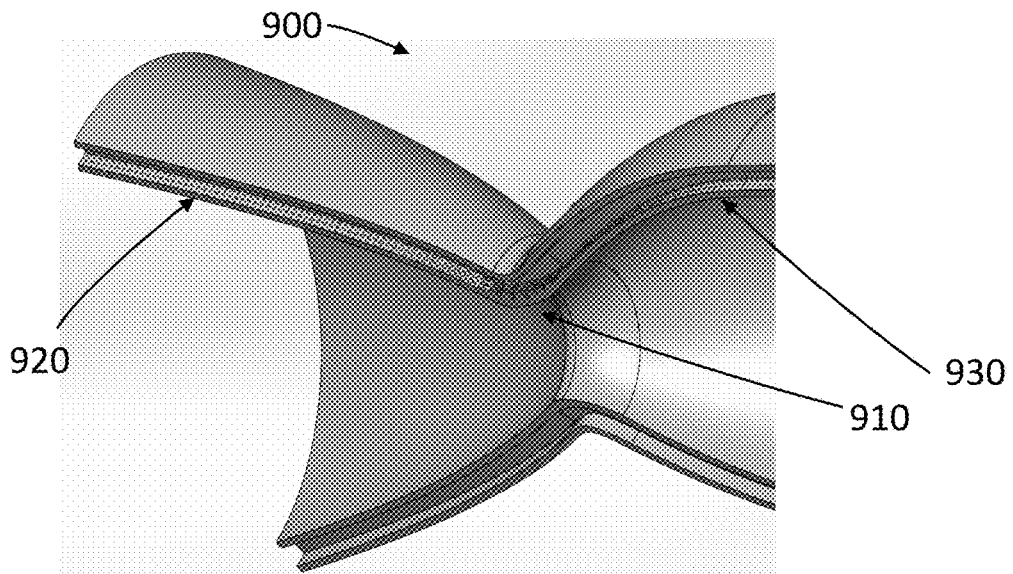
FIG. 9C is a close-up perspective view of a portion of the Liquid Rocket Engine of FIG. 9A.
Figure 9D:
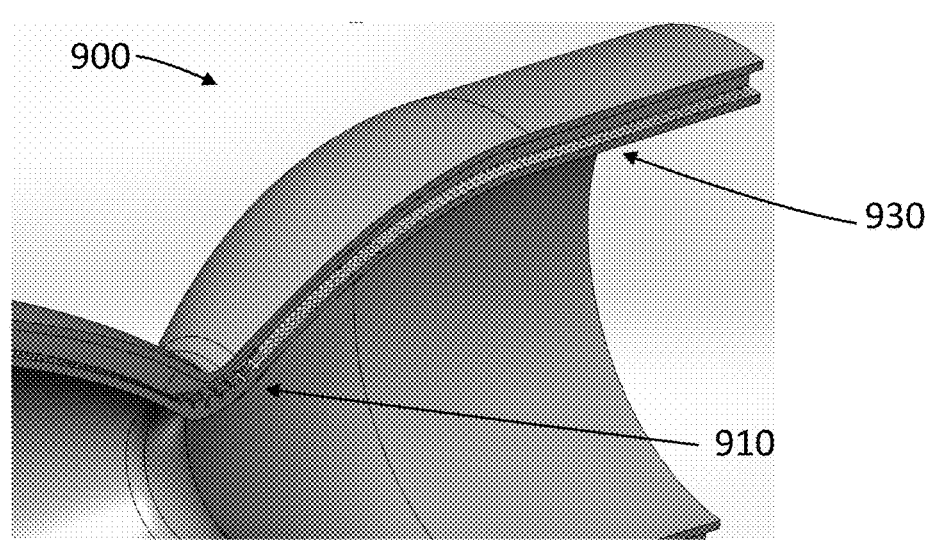
FIG. 9D is another close-up perspective view of a portion of the Liquid Rocket Engine of FIG. 9A.
Figure 9E:
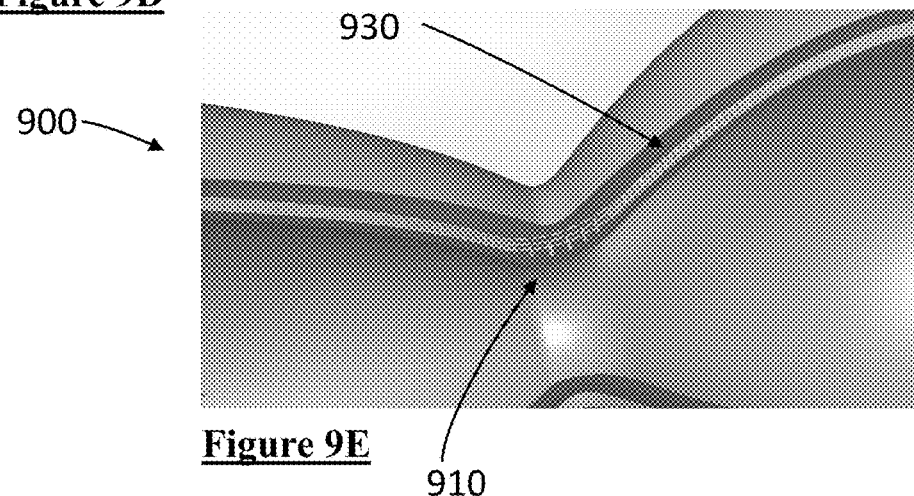
FIG. 9E is another close-up perspective view of a portion of the Liquid Rocket Engine of FIG. 9A.

FIG. 8 shows a comparison graph of wall temperature vs. axial position for a set of three (3) swirl inducing channel designs, each candidate surface design applied within a cooling channel. The results were experimentally obtained. The set of three (3) designs are a subset of the designs of FIGS. 6 and 7, i.e., designs 6.4, 6.6, and 6.7. Wall temperature at eight (8) thermocouple locations (½ inch spacing) for different swirling designs are presented. The single run of the variable swirl is compared with an average 10 runs for other swirling designs. Over 20 runs total, the two constant swirl designs (designs 6.6 and 6.7) show an expected temperature increase of 60-70 deg F./in along the length of the tube. The baseline variable swirl design 6.4, which tightens the helical pitch by a factor of 3 at the midpoint, shows 60 deg F./in temperature increase across the first 4 thermocouples, as expected, but shows a temperature decrease of 11 deg F./in after the fourth thermocouple, indicating a much higher rate of heat transfer after the fourth thermocouple. The net trend for temperature increase across this article is about half the expected value for a constant pitch helix.

It is unsurprising that the trend over the latter 4 thermocouples showed a decrease in wall temperature (a goal of such localized variations may be to evenly balance the wall temperature by functionally grading the variations). In the case of the presented test article, a surface topology design featuring a helix with pitch decreasing at a functional rate along the tube length could create an even wall temperature along the length of the tube. Assuming the heat input along the wall is even, the increasing rate of swirl may be matched to the increase in temperature of the cooling fluid as it flows along the channel. In a real liquid rocket engine wall, functional variations such as these may be used to maintain even wall temperature and minimize hot spots.

It is evident that variations within a single design have significant localized effects across lengths as short as 1-2 inches within a cooling channel with hydraulic diameter of approximately 0.03 inches and wall thickness of approximately 0.1 inches. Therefore, the functional grading and intermixing of different surface topology designs may optimize for maximized heat transfer or for minimized pressure drop at different locations along the same cooling channel. Further investigation with more localized investigation of performance variables is expected show more localized control. This expectation has been verified by Computational Fluid Dynamics.

FIGS. 9A-E depicts a sequence of views of a Liquid Rocket Engine 900 with portions 910 additively manufactured using the system for manipulating surface topology of fluid manifolds of FIG. 1. More specifically, FIGS. 9A-E depict one embodiment of a liquid rocket engine regenerative heat exchanger with surface topology manipulations designed to elicit different performance at different locations along the flow path.

In laboratory experimentation examining flow friction and heat transfer performance of a rocket fuel through a rocket engine-like cooling tube, under rocket engine-like heating and flow conditions, many different performance capabilities were observed using different features. Certain features increased or decreased both flow friction and heat transfer by varying amount. Variation of a feature along the length of the cooling tube was shown to drive different performance at different locations along the tube. The laboratory study has shown that key performance parameters can be co-optimized using intentional manipulation of the surface topology of a cooling tube. This co-optimization or pareto-optimization can be variable at any point along the flow path depending on the parameters and the priorities of optimization. Individual features without variation have shown a combined performance change of 30%-40% to both parameters of interest. Other experimentation showed performance change in excess of 150% to one parameter, with variable effects on the other. For the two studied parameters flow friction and heat transfer, increases to both, decreases to both, and both combinations of increase to one, decrease to the other were observed using different features.

Generally, the rocket engine with heat exchanger 900 of FIGS. 9A-E comprises topological surface features which interact with fluid flows designed and imparted into relevant fluid-interacting surfaces of the structure to manipulate chosen performance parameters. The structure of the rocket engine consists of a combustion chamber, throat, and nozzle concentric to a circular array of many cooling channels. The outer wall of the combustion chamber, throat, and nozzle is shared with the inner walls of the cooling channels. In this case, the chosen performance goals are to create a uniform strength distribution over the entire wall by way of generating a specific temperature profile along the length of the wall, and to minimizing frictional pressure losses in the fluid in the cooling manifold as much as possible while still addressing the primary goal of temperature distribution.

In the embodiment of FIGS. 9A-E, the cooling fluid is also the fuel which is combusted in the engine. It is generally beneficial to combustion to pre-heat propellant so long as it is not heated to the point that it chemically degrades and is an additional benefit to system performance which can be maximized and balanced with thermally induced degradation of the fuel by the topological surface features.

An alternative embodiment to a heat exchanger may instead be a hydrofoil which attempts to minimize skin-friction while also minimizing manufacturing cost using simple features where a lower level of optimization provides a cost-benefit over areas with less complex fluid interactions, or any system with fluid-structure interaction and goals which can be maximized, minimize, or optimized in combination for greater performance of the overall system.

Inside the rocket engine chamber, combustion is driven by the continuous injection of propellant into an already combusting mixture. Combusted propellants are driven through the throat, which forces flow to become supersonic, and flow expands and accelerates as it exists the nozzle. The walls contacting the combusted propellants along the entire length of the chamber, throat, nozzle structure feature a surface texture which minimized heat transfer into the wall and the surfaces is post-processed to decrease roughness to minimize heat transfer into the wall from the combusted propellant flow. Counterflowing to the combustion is the coolant flow, which is also the fuel that eventually is consumed by combustion. The coolant flows counter to the direction of the combustion flow in the cooling channels. While passing over the nozzle, a texture which decreases the rate of heat transfer is graded into a texture which increases the rate of heat transfer to provide cooling such that the temperature profile of the wall provides a consistent structural margin over the variable diameter of the nozzle. As the coolant passes over the throat, features which greatly increase heat transfer are used, as the throat is typically the hottest part of the engine and demands the most cooling, and the features may be graded to elicit the desired temperature profile over the length of the throat.

After passing the throat, the coolant has boiled entirely. The now gaseous coolant then passes over the combustion chamber, which has features designed for heat transfer, and that increase in size to drive the same amount of heat transfer as the coolant temperature increases as it flows over the length of the combustion chamber. Due to the decreased cooling capability of a gas, larger features 920 are used to cool the combustion chamber than are used to cool the nozzle. Feature 910 are variable fins, feature 920 are variable dimples, and feature 930 are variable anti-dimple.

FIGS. 10A-C depict a sequence of views of an airfoil with portions additively manufactured using the system for manipulating surface topology of fluid-interacting structures of FIG. 1. More specifically, FIGS. 9A-E depict one embodiment of a liquid rocket engine regenerative heat exchanger with surface topology manipulations designed to elicit different performance at different locations along the flow path.

In the design of the airfoil 1000 of FIGS. 10A-C, a designer is attempting to manipulate the surface topology of an airfoil to increase lift and decrease parasitic drag. The designer may choose to achieve such design objectives by minimizing drag over the front and across the bottom of the airfoil, while increasing drag over the top of the airfoil to increase lift. Parameters used to characterize such an airfoil may include coefficient of lift, coefficient of drag, skin friction coefficient, pressure, temperature, and velocity of the fluid, turbulence, local values or local averages of these values, or other, general trends including flow separation from the airfoil, and others.

For the case of an airfoil, which is meant to operate under many flow regimes and different angle, the designer would choose a range of stable angles of attack and a range of flow velocities to analyze the airfoil using simulation or other computational or test based methods. After characterizing the baseline airfoil performance, the designer selects local sizes for topological features at certain points along the airfoil using a computational method which considers all the simulations performed, and functionally grades between the locally selected features and sizes. Sizes may correlate with local geometry of the airfoil or any parameter used in characterization.

For this optimization of lift and parasitic drag, one configuration of topological features may be thin fins/flow guides along the front 1010 and bottom 1040, which change to dimples 1020 across the top. The dimples 1020 functionally vary in size to target a local average performance across the many angles of attack and flow regimes with consideration for staying within certain performance bounds for high angle of attack and/or low or transitional Reynolds number flow cases which may have more unique flow phenomena. The purpose of the dimples 1020 is to increase and locally control lift generation, the purpose of the thin fins 1010, 1040 is to reduce parasitic drag by conditioning of the boundary layer and guiding the flow direction at the boundary layer. The designer may also use the thin fins in an area along the top of the airfoil where flow separation begins at high angle of attack to prevent or minimize separation. This may be driven by needing to stably achieve certain angles of attack or it may provide a better overall lift-drag case depending on how pervasive and significant flow separation is across the multiple flow regimes and angles of attack.

In another aspect, a designer may only optimize an airfoil for one flow regime and angle of attack, given that this one flow is the primary flow regime of most/all of the aircraft's missions and that other flow regimes are still evaluated to assure that the optimization in one regime does not cause instabilities in other flow regimes the aircraft will experience, for example during takeoff and landing.

The benefits of the disclosed fluid-structure system are achieved by skilled implementation of engineering design methods including but not limited to simulation of the fluid-structure interaction, calculation of performance parameters related to or affected by the flow, laboratory testing of different flow features under relevant flow parameters to select which features to use in the design and how to combine, sequence, intermix, and functionally vary them, generative design methods or other AI or machine learning methods for design and/or optimization features and how they are combined, sequence, intermixed, and varied. The optimization or co-optimization can be performed over differential lengths relevant to the manufacturing process. For some features made with some additive manufacturing processes, such as surface roughness of powder bed laser fusion metal, a differential length as low as 100 microns may be possible for optimize. For other manufacturing methods and other features, a longer differential length is needed. For example, a small dimple built via Filament Deposition Modeling may be at minimum 1000 micron across, meaning that reasonable differentiation in the features may be attainable across a 2000 micron long area. These methods are best applied to fluid structure systems where the minimum attainable feature size is much smaller than the surface the feature is applied to. These methods are best applied to higher speed flow for the largest performance impact.

Performance parameters impacted by these features may include but are not limited to any parameter describing the flow of the fluid or the fluid structure interaction, including heat transfer, temperature, and deposition due to degradation of a fluid due to heat, parameters related to mixing of multiple fluids, interaction of fluids with catalytic surfaces, etc.

The above embodiments may, in combination or separately, may utilize computer software and/or computer hardware (to include, for example, computer-readable mediums) for any of several functions such as automated control and state estimation, and furthermore may utilize one or more GUIs for human interaction with modules or elements or components.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to a manipulation of surface topology of an additively manufactured article. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manipulating a surface topology of an additively manufactured article, the method comprising:
   determining a set of design objectives for an article;

assembling a set of candidate surface topology designs, each of the candidate surface topology designs comprising a candidate surface design to form a set of candidate surface designs;

quantifying a set of performance measurements of each of the set of candidate surface designs;

categorizing the set of candidate surface designs with respect to the set of design objectives;

selecting a first particular candidate surface design from the set of candidate surface designs, the first particular candidate surface design associated with a first particular article location of the article;

generating a first set of additive manufacturing specifications associated with the first particular article location; and additively manufacturing the article to satisfy the first set of additive manufacturing specifications; wherein:

an additively manufactured article is produced.

2. The method of claim 1, wherein the article is a fluid manifold.

3. The method of claim 2, wherein the fluid manifold is a Liquid Rocket Engine fluid manifold.

4. The method of claim 1, wherein the article is an airfoil.

5. The method of claim 1, wherein the set of performance measurements comprise experimentally-generated performance measurements.

6. The method of claim 1, wherein each of the set of candidate surface topology designs further comprises a candidate surface manufacturing design to form a set of candidate surface manufacturing designs.

7. The method of claim 6, further comprising the step of selecting a first particular candidate surface manufacturing design from the set of candidate surface manufacturing designs, the first particular candidate manufacturing surface design associated with the first particular article location of the article.

8. The method of claim 1, further comprising the steps of:

selecting a second particular candidate surface design from the set of candidate surface designs, the second particular candidate surface design associated with a second particular article location of the article;

generating a second set of additive manufacturing specifications associated with the second particular article location; and additively manufacturing the article to satisfy the second set of additive manufacturing specifications.

9. The method of claim 1, wherein the set of performance measurements comprise a fluid friction loss value and a heat transfer value.

10. The method of claim 1, wherein the step of categorizing the set of candidate surface designs with respect to the set of design objectives comprises use of at least one of a Stanton Number value and a Darcy Friction Factor value.

11. An article with varied surface topology satisfying a set of article design objectives, comprising:

a first particular article location of the article, the first particular location having a first particular candidate surface design selected from a set of candidate surface designs, the first particular candidate surface design having a first set of additive manufacturing specifications satisfying the set of article design objectives associated with the first particular article location; and a second particular article location of the article, the second particular location having a second particular candidate surface design selected from a set of candidate surface designs, the second particular candidate surface design having a second set of additive manufacturing specifications satisfying the set of article design objectives associated with the second particular article location;

wherein:

the article is additively manufactured using both the first set of additive manufacturing specifications and the second set of additive manufacturing specifications.

12. The article of claim 11, wherein the article is a fluid manifold.

13. The article of claim 11, wherein the fluid manifold is a Liquid Rocket Engine fluid manifold.

14. The article claim 11, wherein the article is an airfoil.

15. The article of claim 11, wherein:

the article is a structure defining an enclosed cavity, the first particular candidate surface design formed on a first interior portion of the article and the second particular candidate surface design formed on a second interior portion of the article; and the set of article design objectives comprise:

a first fluid friction loss value and a first heat transfer value, each associated with the first interior portion of the article; and a second fluid friction loss value and a second heat transfer value, each associated with the second interior portion of the article.

16. The article of claim 11, wherein:

the article is a structure defining an enclosed cavity, the first particular candidate surface design formed on a first exterior portion of the article and the second particular candidate surface design formed on a second exterior portion of the article; and the set of article design objectives comprise:

a first fluid friction loss value and a first heat transfer value, each associated with the first exterior portion of the article; and a second fluid friction loss value and a second heat transfer value, each associated with the second exterior portion of the article.

17. The article of claim 11, wherein the first particular location further comprises a first particular candidate surface manufacturing design selected from a set of candidate surface manufacturing designs.

18. The article of claim 11, wherein:

the first particular location further comprises a first particular candidate surface manufacturing design selected from a set of candidate surface manufacturing designs; and the second particular location further comprises a second particular candidate surface manufacturing design selected from a set of candidate surface manufacturing designs.

19. The article of claim 18, wherein the first particular candidate surface manufacturing design comprises at least one of roughness features and porosity features.

20. The article of claim 18, wherein the first particular candidate surface design comprises at least one of dimple features and grooved channel features.

* * * * *